US012567647B2

(12) United States Patent
Wu et al.

(10) Patent No.: US 12,567,647 B2
(45) Date of Patent: Mar. 3, 2026

(54) BATTERY AND ELECTRIC APPARATUS

(71) Applicant: CONTEMPORARY AMPEREX TECHNOLOGY CO., LIMITED, Ningde (CN)

(72) Inventors: Kai Wu, Ningde (CN); Jianhuang Ke, Ningde (CN); Yao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/295,673

(22) Filed: Aug. 10, 2025

(65) Prior Publication Data

US 2025/0364678 A1      Nov. 27, 2025

Related U.S. Application Data

(63) Continuation of application No. PCT/CN2023/119245, filed on Sep. 15, 2023.

(30) Foreign Application Priority Data

Jun. 7, 2023     (CN) ......................... 202310671230.X

(51) Int. Cl.
| | |
|---|---|
| *H01M 50/367* | (2021.01) |
| *H01M 50/209* | (2021.01) |
| *H01M 50/342* | (2021.01) |

(52) U.S. Cl.
CPC ....... *H01M 50/367* (2021.01); *H01M 50/209* (2021.01); *H01M 50/3425* (2021.01); *H01M 2220/20* (2013.01)

(58) Field of Classification Search
CPC ........... H01M 50/367; H01M 50/3425; H01M 50/209
See application file for complete search history.

(56) References Cited

U.S. PATENT DOCUMENTS

2022/0123423 A1*   4/2022   Wang .................. H01M 50/249

FOREIGN PATENT DOCUMENTS

| CN | 218939874 U | 4/2023 |
|---|---|---|
| CN | 219067034 U | 5/2023 |

(Continued)

OTHER PUBLICATIONS

The International Search Report received in the counterpart International Application No. PCT/CN2023/119245, dated Nov. 23, 2023, 7 pages with English translation.

(Continued)

*Primary Examiner* — Basia A Ridley
*Assistant Examiner* — Heng M. Chan
(74) *Attorney, Agent, or Firm* — K&L Gates LLP

(57) ABSTRACT

A battery and an electric apparatus are disclosed. The battery includes a box, a battery module disposed within the box, and a pressure relief channel. The battery module includes at least one battery cell, each equipped with a first pressure relief mechanism. The box includes a second pressure relief mechanism. The pressure relief channel connects the first pressure relief mechanism of at least one battery cell to the second pressure relief mechanism. Upon actuation, the first pressure relief mechanism releases emissions from inside the battery cell into the pressure relief channel. The pressure relief channel guides the emissions to the second pressure relief mechanism, which, when actuated, discharges the emissions to the exterior of the box. This structure enables the reduction of internal temperature and pressure in the box during abnormal conditions, helping reduce the risk of severe damage and enhancing the operational safety and reliability of the battery.

19 Claims, 18 Drawing Sheets

(56)  References Cited

FOREIGN PATENT DOCUMENTS

| CN | 116613455 | A  | 8/2023 |
|----|-----------|----|--------|
| CN | 116742262 | A  | 9/2023 |
| CN | 116742263 | A  | 9/2023 |
| EP | 4064436   | A1 | 9/2022 |

OTHER PUBLICATIONS

The IISA Written Opinion received in the counterpart International Application No. PCT/CN2023/119245, dated Nov. 23, 2023, 12 pages with English translation.

* cited by examiner

1100

BATTERY AND ELECTRIC APPARATUS

This application is a continuation of International Application No. PCT/CN2023/119245, filed on Sep. 15, 2023, which claims priority to Chinese Patent Application No. 202310671230.X, filed on Jun. 7, 2023, at the China Patent Office, entitled "BATTERY AND ELECTRIC APPARATUS," which is incorporated herein by reference in its entirety.

TECHNICAL FIELD

This application relates to the field of battery technologies, and more particularly to a battery and an electric apparatus.

BACKGROUND

Batteries are widely used in carious electronic devices such as mobile phones, laptops, battery carts, electric vehicles, electric aircrafts, electric ships, electric toy cars, electric toy ships, electric toy aircrafts, and electric tools. The batteries may include nickel-cadmium batteries, nickel-hydrogen batteries, lithium-ion batteries, secondary alkaline zinc-manganese batteries, and the like.

In the development process of battery technology, in addition to studying the performance of batteries, how to improve the reliability of batteries during use is also one of the key research focuses.

The statements above are only used to provide background technical information related to this application and do not necessarily constitute prior art.

SUMMARY

An objective of embodiments of this application is to provide a battery and an electric apparatus so as to improve the reliability of batteries during use.

The following technical solutions are used in the embodiments of this application.

According to a first aspect, an embodiment of this application provides a battery including a box, a battery module, and a pressure relief channel, where the battery module is located inside the box, the battery module includes at least one battery cell, each battery cell is provided with a first pressure relief mechanism, the box has a second pressure relief mechanism; the pressure relief channel connects the first pressure relief mechanism of at least one battery cell and the second pressure relief mechanism, the first pressure relief mechanism is configured to release emissions generated inside the battery cell into the pressure relief channel when actuated; the pressure relief channel is configured to guide the emissions to move to the second pressure relief mechanism, and the second pressure relief mechanism is configured to release the emissions from the pressure relief channel to the outside of the box when actuated.

In the battery of the embodiment of this application, when a battery cell inside the battery undergoes thermal runaway, the first pressure relief mechanism is actuated, and the emissions generated by the battery cell are released into the pressure relief channel through the first pressure relief mechanism and move along the pressure relief channel to the second pressure relief mechanism. As the thermal runaway intensifies, the second pressure relief mechanism is actuated, and the emissions in the pressure relief channel are released to the outside of the box through the second pressure relief mechanism. This reduces the temperature and pressure inside the box, which helps reduce the risk of severe damage to the box and enhance the reliability of the battery during use.

In some embodiments, a pressure relief area of the second pressure relief mechanism is S, and a length of a shortest discharge path formed between the first pressure relief mechanism of at least one battery cell and the second pressure relief mechanism is L; and $$0.25 \text{ dm}^{-1} \le \frac{L}{S} < 250 \text{ dm}^{-1},$$

where a unit of S is dm$^2$, and a unit of L is dm.

By adopting the technical solution of this embodiment, the setting of $$0.25 \text{ dm}^{-1} \le \frac{L}{S} < 250 \text{ dm}^{-1}$$

ensures that the pressure relief area S of the second pressure relief mechanism and the shortest discharge path L of the battery cell have a reasonable design, which helps reduce the exhaust temperature of the battery and enhance the reliability of the battery during use.

In some embodiments, a pressure relief area of the second pressure relief mechanism is S, and a length of a shortest discharge path formed between the first pressure relief mechanism of any one battery cell and the second pressure relief mechanism is L; and $$0.25 \text{ dm}^{-1} \le \frac{L}{S} < 250 \text{ dm}^{-1},$$

where a unit of S is dm$^2$, and a unit of L is dm.

By adopting the technical solution of this embodiment, the shortest discharge path L of each battery cell and the pressure relief area S of the second pressure relief mechanism each are within a reasonable design range, which further enhances the reliability of the battery during use.

In some embodiments, $$0.25 \text{ dm}^{-1} \le \frac{L}{S} \le 100 \text{ dm}^{-1}.$$

By adopting the technical solution of this embodiment, the setting of $$0.25 \text{ dm}^{-1} \le \frac{L}{S} \le 100 \text{ dm}^{-1}$$

ensures that the pressure relief area S of the second pressure relief mechanism and the length L of the shortest discharge path of the battery cell have a more reasonable design, which helps reduce the exhaust temperature of the battery and enhances the reliability of the battery during use. Under the condition that $$\frac{L}{S} \le 100 \text{ dm}^{-1}$$

is met, when the length L of the shortest discharge path of the battery cell remains constant, the pressure relief area S of the second pressure relief mechanism may be designed larger, which improves the smoothness of emission discharge from the box and reduces the risk of severe bulging of the box due to poor exhaust.

In some embodiments, 0.5 dm≤L≤29 dm.

By adopting the technical solution of this embodiment, the length L of the shortest discharge path being within this range ensures that the shortest discharge path is not designed too short, which would result in a short cooling time for particulate matter, leading to high temperatures of the particulate matter discharged from the battery and potentially deteriorating the external environment of the battery; nor is the shortest discharge path designed too long, which would result in a long exhaust time and untimely pressure relief, causing severe damage to the box.

In some embodiments, a volumetric energy density of the battery is E, and a pressure relief area of the second pressure relief mechanism is S; and $$200\,(\mathrm{Wh}/L)/\mathrm{dm}^2 < \frac{E}{S} < 6100\,(\mathrm{Wh}/L)/\mathrm{dm}^2,$$

where a unit of E is Wh/L, and a unit of S is dm$^2$.

By adopting the technical solution of this embodiment, the setting of $$200\,(\mathrm{Wh}/L)/\mathrm{dm}^2 < \frac{E}{S} < 6100\,(\mathrm{Wh}/L)/\mathrm{dm}^2$$

ensures that the pressure relief area S of the second pressure relief mechanism and the volumetric energy density E of the battery have a reasonable design, which helps reduce the exhaust temperature of the battery and enhance the reliability of the battery during use.

In some embodiments, $$200\,(\mathrm{Wh}/L)/\mathrm{dm}^2 < \frac{E}{S} < 4500\,(\mathrm{Wh}/L)/\mathrm{dm}^2.$$

By adopting the technical solution of this embodiment, the pressure relief area S of the second pressure relief mechanism and the volumetric energy density E of the battery have a more reasonable design, which helps reduce the exhaust temperature of the battery, resulting in better reliability of the battery during use. Additionally, under the condition that $$\frac{E}{S} \le 4500\,(\mathrm{Wh}/L)/\mathrm{dm}^2$$

is met, when the volumetric energy density E of the battery remains constant, the pressure relief area S of the second pressure relief mechanism may be designed larger, which improves the smoothness of emission discharge from the box and reduces the risk of severe bulging of the box due to poor exhaust.

In some embodiments, a pressure relief area of the second pressure relief mechanism is S, a volumetric energy density of the battery is E, and a length of a shortest discharge path formed between the first pressure relief mechanism of at least one battery cell and the second pressure relief mechanism is L; and $$1.06 \times 10^2\,(\mathrm{Wh}/L)/\mathrm{dm} \le \frac{E \times L}{S} \le 1.76 \times 10^5\,(\mathrm{Wh}/L)/\mathrm{dm},$$

where a unit of E is Wh/L, the unit of S is dm$^2$, and a unit of L is dm.

By adopting the technical solution of this embodiment, the value of $$\frac{E \times L}{S}$$

being within the above range ensures that the pressure relief area S of the second pressure relief mechanism, the volumetric energy density E of the battery, and the length L of the shortest discharge path formed between the first pressure relief mechanism of the battery cell and the second pressure relief mechanism have a more reasonable design, which helps reduce the exhaust temperature of the battery, resulting in better reliability of the battery during use.

In some embodiments, a pressure relief area of the second pressure relief mechanism is S, a volumetric energy density of the battery is E, and a length of a shortest discharge path formed between the first pressure relief mechanism of any one battery cell and the second pressure relief mechanism is L; and $$1.06 \times 10^2\,(\mathrm{Wh}/L)/\mathrm{dm} \le \frac{E \times L}{S} \le 1.76 \times 10^5\,(\mathrm{Wh}/L)/\mathrm{dm},$$

where a unit of E is Wh/L, a unit of S is dm$^2$, and a unit of L is dm.

By adopting the technical solution of this embodiment, the shortest discharge path L of each battery cell, the pressure relief area S of the second pressure relief mechanism, and the volumetric energy density E of the battery cell each are within a reasonable design range, which can better enhance the reliability of the battery during use.

In some embodiments, $$1.06 \times 10^2\,(\mathrm{Wh}/L)/\mathrm{dm} \le \frac{E \times L}{S} \le 1.29 \times 10^5\,(\mathrm{Wh}/L)/\mathrm{dm}.$$

By adopting the technical solution of this embodiment, the shortest discharge path L of the battery cell, the pressure relief area S of the second pressure relief mechanism, and the volumetric energy density E of the battery cell each are within a more reasonable design range, which can better enhance the reliability of the battery during use. Additionally, under the condition that $$\frac{E \times L}{S} \le 1.29 \times 10^5\,(\mathrm{Wh}/L)/\mathrm{dm}$$

is met, when the value of E×L remains constant, the pressure relief area S of the second pressure relief mechanism may be designed larger, which improves the smoothness of emission discharge from the box and reduces the risk of severe bulging of the box due to poor exhaust.

In some embodiments, 400 Wh/L≤E≤800 Wh/L.

By adopting the technical solution of this embodiment, the volumetric energy density E of most batteries falls within the above range, so that the above formula can be applied to most batteries, with a wide range of applicability.

In some embodiments, 0.1 dm²≤S≤2 dm².

By adopting the technical solution of this embodiment, the pressure relief area S of the second pressure relief mechanism being within the above range can reduce the risks of severe damage to the box and excessive temperature, which helps enhance the reliability of the battery during use. When the pressure relief area S of the second pressure relief mechanism is designed too small, exhaust becomes obstructed, causing untimely pressure relief and easily leading to severe damage to the box; and when the pressure relief area S of the second pressure relief mechanism is designed too large, oxygen from the air outside the battery may flow back into the box and become in contact with the high-temperature emissions inside the box, further deteriorating the internal environment of the box.

In some embodiments, 0.3 dm²≤S≤1 dm².

By adopting the technical solution of this embodiment, the pressure relief area S of the second pressure relief mechanism is designed more reasonably, which can further reduce the risks of severe damage to the box and excessive battery temperature, and help enhance the reliability of the battery during use.

In some embodiments, the pressure relief channel further includes a first sub-pressure relief channel configured to be connected to the second pressure relief mechanism, and the battery further includes a partition, where the partition is configured to separate the battery module from the first sub-pressure relief channel, the partition is provided with a plurality of first ventilatable structures, and each first ventilatable structure connects the first pressure relief mechanism of at least one battery cell and the first sub-pressure relief channel.

By adopting the technical solution of this embodiment, after a battery cell in the battery module undergoes thermal runaway, the emissions released by the first pressure relief mechanism of the battery cell enter the first sub-pressure relief channel through the first ventilatable structure, and the first sub-pressure relief channel is separated from the battery module by the partition, which can reduce the risk of contact between the emissions in the first sub-pressure relief channel and other battery cells in the battery module, thereby reducing the risk of thermal runaway propagation and helping enhance the reliability of the battery during use.

In some embodiments, the pressure relief channel includes at least two first sub-pressure relief channels, each first sub-pressure relief channel connects the first ventilatable structures corresponding to different battery cells, and the first sub-pressure relief channels are separated by spacing elements.

By adopting the technical solution of this embodiment, when one battery cell undergoes thermal runaway, the emissions released by the battery cell enter the first sub-pressure relief channel connected to the battery cell, and the first sub-pressure relief channels are separated by a spacing element, so that the emissions are prevented from directly entering other first sub-pressure relief channels, which helps reduce the risk of thermal runaway propagation.

In some embodiments, the pressure relief channel further includes a communication channel, a wall surface of the partition and an inner wall surface of the box enclose the communication channel, and each first sub-pressure relief channel is connected to the second pressure relief mechanism through the communication channel.

By adopting the technical solution of this embodiment, the communication channel is enclosed by the wall surface of the partition and the inner wall surface of the box, resulting in a simple structure that is easy to process and manufacture.

In some embodiments, the battery module includes at least one row of battery cells, each row of battery cells includes at least one battery cell, each row of battery cells is correspondingly provided with at least one first sub-pressure relief channel, each first sub-pressure relief channel extends along an arrangement direction of the corresponding row of battery cells; and each first ventilatable structure corresponding to each row of battery cells is connected to the corresponding first sub-pressure relief channel.

By adopting the technical solution of this embodiment, when a battery cell undergoes thermal runaway, the emissions released by the battery cell enter the corresponding first sub-pressure relief channel for discharge, so that the emissions are prevented from entering other first sub-pressure relief channels and becoming in contact with other battery cells, reducing the risk of thermal runaway propagation and improving the reliability of the battery cells.

In some embodiments, the second pressure relief mechanism is located on a side of an end portion of the battery module along an extension direction of the first sub-pressure relief channel.

By adopting the technical solution of this embodiment, after a battery cell undergoes thermal runaway, the emissions in the first sub-pressure relief channel can be quickly discharged to the second pressure relief mechanism, resulting in good pressure relief and exhaust effects for the battery.

In some embodiments, the communication channel is an annular channel, and the annular channel is arranged around the partition.

By adopting the technical solution of this embodiment, the emissions discharged from the first sub-pressure relief channel enter the annular channel and flow along the annular channel, so that the discharge path can be extended and thus the cooling time of particulate matter in the emissions can be prolonged, resulting in a low temperature of the particulate matter when discharged outside the battery, which helps enhance the reliability of the battery during use.

In some embodiments, an end plate is provided at each of two ends of at least one row of battery cells, the end plates are inserted into the annular channel and sealingly connected to the inner wall surface of the box; and the pressure relief channel further includes a second sub-pressure relief channel, where the second sub-pressure relief channel intersects with the first sub-pressure relief channel, and the second sub-pressure relief channel is configured to connect the corresponding first sub-pressure relief channel and the annular channel.

By adopting the technical solution of this embodiment, the emissions released by the battery cell need to pass through the first sub-pressure relief channel, the second sub-pressure relief channel, and the annular channel before flowing to the second pressure relief mechanism and finally being discharged outside the battery, so that the discharge path can be extended and the cooling time of particulate matter in the emissions can be prolonged, resulting in a low temperature of the particulate matter when the particulate matter is discharged outside the battery, which helps enhance the reliability of the battery during use.

In some embodiments, an end plate is provided at each of two ends of each row of battery cells, and each first sub-pressure relief channel is in communication with the second sub-pressure relief channel.

By adopting the technical solution of this embodiment, when any battery cell in the battery cells undergoes thermal runaway, the emissions released by the battery cell flow into the annular channel through the corresponding first sub-pressure relief channel and second sub-pressure relief channel, then flow through the annular channel to the second pressure relief mechanism, and are released to the outside of the battery through the second pressure relief mechanism, which helps enhance the reliability of the battery during use.

In some embodiments, the pressure relief channel includes a plurality of second sub-pressure relief channels, and the second sub-pressure relief channels are separated by the spacing elements.

By adopting the technical solution of this embodiment, the design of a plurality of second sub-pressure relief channels allows the emissions in the first sub-pressure relief channel to be discharged through the plurality of second sub-pressure relief channels, which facilitates rapid discharge of the emissions, reduces the risks of internal pressure buildup and excessive temperature in the box, and enhances the reliability of the battery during use.

In some embodiments, the plurality of second sub-pressure relief channels are spaced apart from each other along the extension direction of the first sub-pressure relief channel.

By adopting the technical solution of this embodiment, the battery cells arranged along the extension direction of the first sub-pressure relief channel can quickly discharge the emissions released by the battery cells into the annular channel through the corresponding second sub-pressure relief channels, and finally release the emissions to the outside of the box through the second pressure relief mechanism, which reduces the risks of internal pressure buildup and excessive temperature in the box, and helps enhance the reliability of the battery during use.

In some embodiments, the first sub-pressure relief channel and the second sub-pressure relief channel are perpendicular to each other.

By adopting the technical solution of this embodiment, the first sub-pressure relief channel and the second sub-pressure relief channel are arranged in a regular pattern, facilitating processing and manufacturing.

In some embodiments, the annular channel is provided with an annular member connected to the box, where the annular member is configured to divide the annular channel into a first sub-annular channel and a second sub-annular channel, the second sub-annular channel is arranged around the first sub-annular channel, the annular member is provided with a second ventilatable structure configured to connect the first sub-annular channel and the second sub-annular channel, the second sub-annular channel is connected to the second pressure relief mechanism, and the first sub-annular channel is in communication with the first sub-pressure relief channel.

By adopting the technical solution of this embodiment, the emissions released by the battery cell need to pass through the first sub-annular channel and the second sub-annular channel, so that the discharge path can be extended and the cooling time of particulate matter in the emissions can be prolonged, which helps reduce the risk of excessive exhaust temperature outside the battery and enhances the reliability of the battery during use.

In some embodiments, the second ventilatable structure is a through hole.

By adopting the technical solution of this embodiment, the second ventilatable structure being a through hole has a simple structure and is easy to process and manufacture.

In some embodiments, the annular member includes at least three sidewall portions sequentially connected end-to-end, and the sidewall portion farthest from the second pressure relief mechanism is provided with the second ventilatable structure.

By adopting the technical solution of this embodiment, since the second ventilatable structure is farther from the second pressure relief mechanism, the emissions passing through the second ventilatable structure need to travel a certain distance to reach the second pressure relief mechanism and be discharged from the box, so that the discharge path can be extended and the cooling time of particulate matter in the emissions can be prolonged, which helps reduce the risk of excessive exhaust temperature outside the battery and enhances the reliability of the battery during use.

In some embodiments, the sidewall portion closest to the second pressure relief mechanism is a first sidewall portion, and at least one of the sidewall portion adjacent to the first sidewall portion and the sidewall portion opposite the first sidewall portion is provided with the second ventilatable structure.

By adopting the technical solution of this embodiment, the second ventilatable structure is designed to be far from the second pressure relief mechanism, so that the discharge path can be extended and the cooling time of particulate matter in the emissions can be prolonged, which helps reduce the risk of excessive exhaust temperature outside the battery.

In some embodiments, the second ventilatable structure is located at a middle portion of the corresponding sidewall portion.

By adopting the technical solution of this embodiment, the second ventilatable structure being located at the middle portion of the sidewall portion ensures that the distances from the battery cells at two ends to the second ventilatable structure are not too far, and the emissions released by the battery cells at the ends can also be quickly discharged, which helps enhance the reliability of the battery during use.

In some embodiments, the box further includes a bottom plate, the partition is supported on the bottom plate by the spacing element, the battery module is located above the partition, and the first pressure relief mechanism is located at a bottom of the battery cell.

By adopting the technical solution of this embodiment, the first pressure relief mechanism is located at the bottom of the battery cell, and the battery module is separated from the first sub-pressure relief channel by the partition. In this way, it is difficult for the emissions released by the first pressure relief mechanism to become into contact with the electrical components at the top of the battery cell, which reduces the risk of damage to the battery cell and helps enhance the reliability of the battery during use.

In some embodiments, the partition is a thermal management component, where the thermal management component is configured to exchange heat with the battery module.

By adopting the technical solution of this embodiment, the partition being directly a thermal management component eliminates the need for additional components, which helps reduce the number of parts in the battery and facilitates processing and manufacturing.

According to a second aspect, an embodiment of this application provides an electric apparatus including the battery according to any one of the above embodiments.

The foregoing description is merely an overview of the technical solution of this application. For a better understanding of the technical means in this application so that they can be implemented according to the content of the specification, and to make the above and other objectives, features, and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and persons of ordinary skill in the art may derive other drawings from these accompanying drawings without creative efforts.

Figures 1, 2:
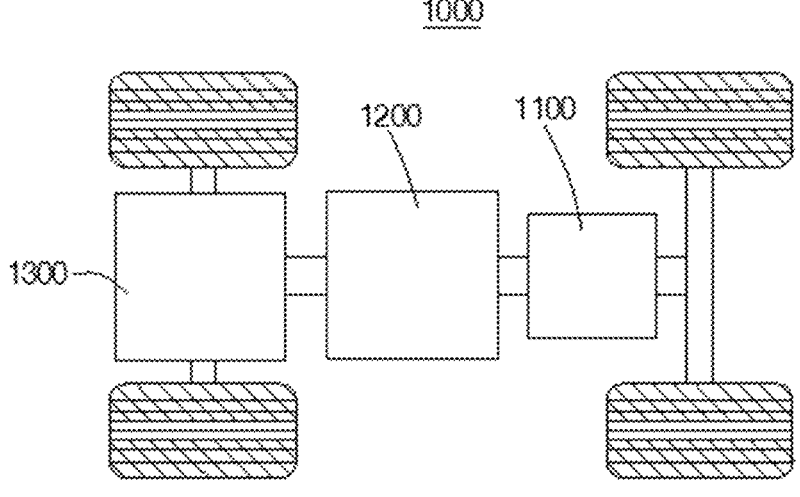
FIG. 1 is a schematic structural diagram of an electric apparatus according to an embodiment of this application.
FIG. 2 is a schematic structural diagram of a battery according to an embodiment of this application.

Reference signs in the drawings are as follows:
1000: Vehicle; 1100: battery; 1200: controller; 1300: motor; 10: box; 11: first portion; 12: second portion; 13: top cover; 14: frame; 15: bottom plate; 16: second pressure relief mechanism; 141: pressure relief hole; 101: first exhaust channel; 102: second exhaust channel; 20: battery module; 21: battery cell; 211: shell; 212: end cover; 213: electrode assembly; 214: electrode terminal; 214*a*: positive electrode terminal; 214*b*: negative electrode terminal; 215: first pressure relief mechanism; 22: end plate; 30: pressure relief channel; 31: first sub-pressure relief channel; 32: communication channel; 33: annular channel; 34: second sub-pressure relief channel; 331: first sub-annular channel; 332: second sub-annular channel; 50: partition; 51: first ventilatable structure; 60: spacing element; 70: annular member; 71: second ventilatable structure; 72: sidewall portion; 73: first sidewall portion; and 80: enclosure member.

DESCRIPTION OF EMBODIMENTS

The embodiments of this application are described in detail below. Examples of the embodiments are shown in the accompanying drawings 1 to 35, and the same or similar reference signs indicate the same or similar components or components with the same or similar functions. The embodiments described below with reference to the drawings 1 to 35 are exemplary and aim to explain this application, but cannot be understood as a limitation of this application.

In the descriptions of this application, it should be understood that the orientations or positional relationships indicated by the terms "length", "width", "upper", "lower", "front", "rear", "left", "right", "perpendicular", "horizontal", "top", "bottom", "inside", "outside", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this application, "a plurality of" means two or more than two unless otherwise specifically stated.

In the description of this application, unless otherwise specified and defined explicitly, the terms "mounting", "connection", "joining", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

In the description of this application, it should be noted that the term "and/or" is only an associative relationship for describing associated objects, indicating that three relationships may be present. For example, A and/or B may indicate the following three cases: presence of only A; presence of both A and B; and presence of only B.

It should also be noted that, in the embodiments of this application, the same reference sign denotes the same component or part. For identical parts in the embodiments of this application, the drawings may only label one part or component as an example, and it should be understood that the reference sign applies equally to other identical parts or components.

In this specification, the terms "an embodiment", "some embodiments", "an example", "a specific example", or "some examples" mean that a specific feature, structure, material or characteristic described with reference to the embodiment or example is included in at least one embodiment or example of this application. In this specification, illustrative expressions of these terms do not necessarily refer to the same embodiment or example. Moreover, the specific feature, structure, material, or characteristic described may be combined in any suitable manner in any one or more embodiments or examples. In addition, without mutual conflict, those skilled in the art may incorporate and combine different embodiments or examples and features of the different embodiments or examples described in this specification.

In the descriptions of the embodiments of this application, the term "a plurality of" means more than two (inclusive). Similarly, "a plurality of groups" means more than two (inclusive) groups, and "a plurality of pieces" means more than two (inclusive) pieces. "At least one" means one or more than one unless otherwise explicitly specified.

In this application, for ease of description, axis Z in the drawings represents the up-down direction, the positive direction of the axis Z represents up, and the negative direction of the axis Z represents down; axis Y in the drawings represents the front-rear direction, the positive direction of the axis Y represents rear, and the negative direction of the axis Y represents front; and the axis X in the drawings represents the left-right direction, the positive direction of the axis X represents right, and the negative direction of the axis X represents left.

The battery mentioned in the embodiments of this application is a single physical module that includes one or more battery cells for providing a higher voltage and capacity. A battery typically includes a box configured to encapsulate one or more battery cells. The box may prevent liquids or other foreign matter from affecting charging or discharging of the battery cell.

In the embodiments of this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or in other shapes. This is not limited in the embodiments of this application either. Battery cells are typically classified into three types by packaging method: cylindrical cell, prismatic cell, and pouch cell. This is not limited in the embodiments of this application either.

The battery cell includes an electrode assembly and an electrolyte. The electrode assembly includes a positive electrode plate, a negative electrode plate, and a separator. The battery cell mainly relies on migration of metal ions between the positive electrode plate and the negative electrode plate to work.

For the development of battery technologies, many design factors need to be considered, for example, performance parameters such as energy density, cycle life, discharge capacity, and charge and discharge rate, as well as reliability of the battery during use.

For a battery cell, main safety hazards are in the charging and discharging processes. In addition, a suitable ambient temperature also needs to be designed. To effectively avoid unnecessary losses, at least triple protection measures are usually provided for battery cells. Specifically, the protection measures at least include a switch component, selection of an appropriate separator material, and a first pressure relief mechanism.

The first pressure relief mechanism is an element or part that is actuated when internal pressure, temperature, or another condition of the battery cell reaches a predetermined threshold, so as to release the internal pressure or temperature. Design of the threshold varies with different design requirements. The threshold may depend on the material used for one or more of a positive electrode plate, a negative electrode plate, an electrolyte, and a separator in the battery cell. The first pressure relief mechanism may be in a form of an explosion-proof valve, a gas valve, a pressure relief valve, a safety valve, or the like, and may specifically employ an element or part sensitive to pressure or temperature. To be specific, when the internal pressure, temperature, or another condition of the battery cell reaches the predetermined threshold, the first pressure relief mechanism performs an action or a weak structure provided in the pressure relief mechanism is destroyed, thereby forming a channel for releasing the internal pressure or temperature.

"Actuation" mentioned in the embodiments of this application means that the first pressure relief mechanism is put into action or is activated to a given state such that the internal pressure and temperature of the battery cell are released. The actions generated by the first pressure relief mechanism may include, but is not limited to, rupturing, breaking, melting, tearing, or opening at least part of the first pressure relief mechanism. When the first pressure relief mechanism is actuated, emissions inside the battery cell are released from an actuated part. In this way, the battery cell can relieve its pressure and temperature under controllable pressure or temperature, thereby avoiding more serious potential incidents.

When the first pressure relief mechanism is actuated, high-pressure and high-temperature substances inside the battery cell are released from an actuated part as emissions.

In this way, the battery cell can relieve its pressure and temperature under controllable pressure or temperature, thereby avoiding more serious potential incidents.

The emissions from the battery cell mentioned in the embodiments of this application include, but are not limited to, electrolyte, fragments of positive and negative electrode plates and separator because of dissolution or breaking, and high-temperature and high-pressure gases and flames produced by reactions.

Typically, as thermal runaway of the battery cell continues, the emissions released by the battery cell spread within the box of the battery, while the temperature and pressure inside the box continuously rise, causing the box to gradually deform and even suffer severe damage, significantly affecting the reliability of the battery during use.

Based on this, to enhance the reliability of the battery during use, an embodiment of this application provides a battery including a box, a battery module, and a pressure relief channel, where the battery module is located inside the box, the battery module includes battery cells, the battery cell is provided with a first pressure relief mechanism, and the box of the battery is provided with a second pressure relief mechanism. In this way, when a battery cell inside the battery undergoes thermal runaway, the first pressure relief mechanism is actuated, and emissions generated by the battery cell are released into the pressure relief channel through the first pressure relief mechanism; and as the emissions spread within the pressure relief channel, the second pressure relief mechanism is actuated, and the emissions in the pressure relief channel are released to the outside of the box through the second pressure relief mechanism. This reduces the temperature and pressure inside the box, which helps reduce the risk of severe damage to the box and enhance the reliability of the battery during use.

An embodiment of this application discloses a battery and an electric apparatus that uses the battery as a power source. The electric apparatus may be but is not limited to a mobile phone, a tablet, a laptop computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of this application being a vehicle 1000 is used as an example for description of the following embodiments.

Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 1100 inside, where the battery 1100 may be arranged at the bottom, front, or rear of the vehicle 1000. The battery 1100 may be configured to supply power to the vehicle 1000. For example, the battery 1100 may be used as an operational power source for the vehicle 1000. The vehicle 1000 may further include a controller 1200 and a motor 1300, where the controller 1200 is configured to control the battery 1100 to supply power to the motor 1300, for example, to satisfy power needs of start, navigation, and driving of the vehicle 1000.

In some embodiments of this application, the battery 1100 can be used as not only the operational power source for the vehicle 1000 but also a driving power source for the vehicle 1000, replacing or partially replacing fossil fuel or natural gas to provide driving traction for the vehicle 1000.

Referring to FIG. 2, as an embodiment of the battery 1100, the battery 1100 includes a box 10 and a battery module 20, where the battery module 20 is accommodated in the box 10. The box 10 is configured to provide an accommodating space for the battery cell 21. The box 10 may be a variety of structures. In some embodiments, the box 10 may include a first portion 11 and a second portion 12. The first portion 11 and the second portion 12 are engaged with each other so that the first portion 11 and the second portion 12 jointly define an accommodating space for accommodating the battery cell 21. The second portion 12 may be a hollow structure with an opening at one end, the first portion 11 may be a plate structure, and the first portion 11 is engaged with the opening side of the second portion 12, so that the first portion 11 and the second portion 12 jointly define the accommodating space; or the first portion 11 and the second portion 12 may both be hollow structures with an opening on one side, and the opening side of the first portion 11 is engaged with the opening side of the second portion 12. Certainly, the box 10 formed by the first portion 11 and the second portion 12 may be in various shapes, for example, cylinder or cuboid.

In another embodiment, the box 10 may further include a top cover 13, a frame 14, and a bottom plate 15, where the top cover 13 and the bottom plate 15 are respectively installed on the upper and lower sides of the frame 14, so as to define an accommodating space for accommodating the battery cells.

In the battery module 20, the battery module 20 includes one battery cell 21 or a plurality of battery cells 21, and the plurality of battery cells 21 may be connected in series, parallel, or series-parallel, where being connected in series-parallel means a combination of series and parallel connections of the plurality of battery cells 21.

In an embodiment, the plurality of battery cells 21 may be directly connected in series, parallel, or series-parallel, and then the battery module 20 constituted by the plurality of battery cells 21 is accommodated in the box 10; or certainly, a plurality of battery modules 20 are connected in series, parallel, or series-parallel to form an entirety which is accommodated in the box 10. The battery 1100 may further include other structures. For example, the battery 1100 may further include a busbar configured to implement electrical connection between the plurality of battery cells 21. Each battery cell 21 may be a secondary battery or a primary battery, or may be a lithium-sulfur battery, a sodium-ion battery, or a magnesium-ion battery, without being limited thereto. The battery cell 21 may be cylindrical, flat, cuboid, or in other shapes.

Figures 3, 4:
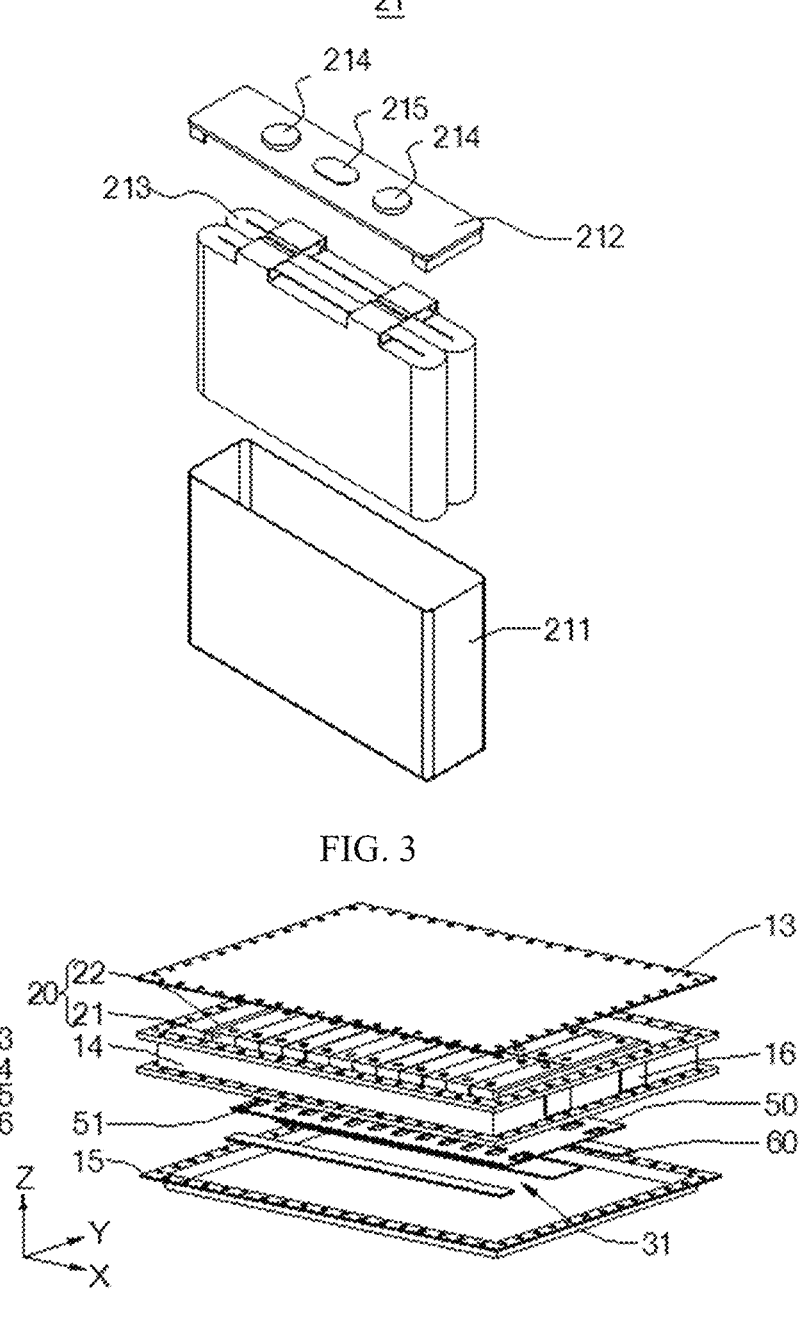
FIG. 3 is a schematic structural diagram of a battery cell according to an embodiment of this application.
FIG. 4 is a schematic exploded view of a battery according to another embodiment of this application.
Figure 5:
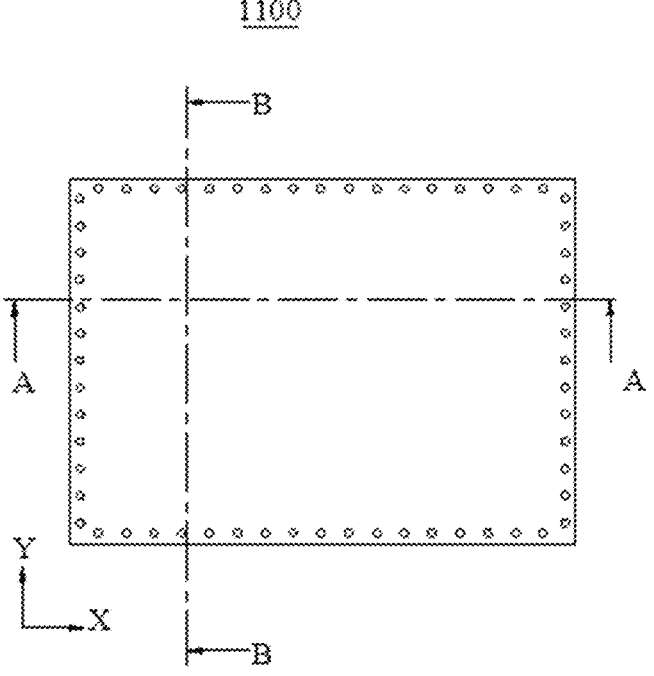
FIG. 5 is a schematic structural diagram of the battery shown in FIG. 4 from one perspective.

Referring to FIG. 3, FIG. 3 is a schematic structural exploded view of a battery cell 21 according to some embodiments of this application. A battery cell 21 refers to a smallest element constituting a battery. As shown in FIG. 3, the battery cell 21 includes a housing, an electrode assembly 213, and other functional components. For example, the housing includes an end cover 212 and a shell 211.

The end cover 212 refers to a component that covers an opening of the shell 211 to separate an internal environment of the battery cell 21 from an external environment. Without limitation, a shape of the end cover 212 may be adapted to a shape of the shell 211 so that the end cover 212 fits with the shell 211. In an embodiment, the end cover 212 may be made of a material with given hardness and strength (for example, aluminum alloy), such that the end cover 212 is less likely to deform when subjected to extrusion and collision, allowing the battery cell 21 to have higher structural strength and enhanced safety performance. The end cover 212 may be provided with functional components such as an electrode terminal 214. The electrode terminal 214 may be configured to be electrically connected to the electrode assembly 213 for outputting or inputting electric energy of the battery cell 21. In some embodiments, the end cover 212 may further be provided with a first pressure relief mechanism 215 for releasing internal pressure when an internal pressure or temperature of the battery cell 21 reaches a threshold. The end cover 212 may alternatively be made of various materials, such as copper, iron, aluminum, stainless steel, aluminum alloy, and plastic, which are not particularly limited in the embodiments of this application. In some embodiments, an insulator may also be provided on an inner side of the end cover 212. The insulator may be configured to separate an electrically connected component in the shell 211 from the end cover 212 so as to reduce the risk of short circuit. For example, the insulator may be made of plastic, rubber, or the like.

The shell 211 is an assembly configured to form an internal environment of the battery cell 21 together with the end cover 212, where the formed internal environment may be configured to accommodate the electrode assembly 213, an electrolyte, and other components. The shell 211 and the end cover 212 may be separate components, an opening may be provided on the shell 211, and the end cover 212 covers the opening to form the internal environment of the battery cell 21. Without limitation, the end cover 212 and the shell 211 may alternatively be integrated. In an embodiment, the end cover 212 and the shell 211 may form a shared connection surface before other components are placed inside the shell, and then the end cover 212 covers the shell 211 when the inside of the shell 211 needs to be enclosed. The shell 211 may be in various shapes and sizes, such as a cuboid shape, a cylindrical shape, and a hexagonal prism shape. In an embodiment, a shape of the shell 211 may be determined according to a specific shape and size of the electrode assembly 213. The shell 211 may be made of various materials, such as copper, iron, aluminum, stainless steel, aluminum alloy, and plastic, which are not particularly limited in the embodiments of this application.

The electrode assembly 213 is a component in the battery cell 21 in which electrochemical reactions take place. The shell 211 may include one or more electrode assemblies 213. The electrode assembly 213 includes a positive electrode, a negative electrode, and a separation element. During charging and discharging of the battery cell, active ions (such as lithium ions) intercalate and deintercalate back and forth between the positive electrode and the negative electrode. The separation element is arranged between the positive electrode and the negative electrode to prevent short circuit of the positive electrode and negative electrode and to allow the active ions to pass through.

In some embodiments, the positive electrode may be a positive electrode plate, and the positive electrode plate may include a positive electrode current collector and a positive electrode active material arranged on at least one surface of the positive electrode current collector.

In some embodiments, the negative electrode may be a negative electrode plate, and the negative electrode plate may include a negative electrode current collector and a negative electrode active material arranged on at least one surface of the negative electrode current collector.

In some embodiments, the separation element is a separator. The separator is not limited to any particular type in this application and may be any well-known porous separator with good chemical stability and mechanical stability.

In some embodiments, the electrode assembly 213 is a wound structure. The positive electrode plate and the negative electrode plate are wound into a wound structure.

In some embodiments, the electrode assembly 213 is a laminated structure.

As shown in FIG. 4 to FIG. 11, in one embodiment of this application, a battery 1100 is provided, where the battery 1100 includes a box 10, a battery module 20, and a pressure relief channel 30, the battery module 20 is located inside the box 10, the battery module 20 includes at least one battery cell 21, each battery cell 21 is provided with a first pressure relief mechanism 215, the box 10 has a second pressure relief mechanism 16; the pressure relief channel 30 connects the first pressure relief mechanism 215 of at least one battery cell 21 and the second pressure relief mechanism 16, the first pressure relief mechanism 215 is configured to release emissions generated inside the battery cell 21 into the pressure relief channel 30 when actuated; the pressure relief channel 30 is configured to guide the emissions to move to the second pressure relief mechanism 16, and the second pressure relief mechanism 16 is configured to release the emissions from the pressure relief channel 30 to the outside of the box 10 when actuated.

The first pressure relief mechanism 215, when actuated, can release the emissions generated by the battery cell 21 due to thermal runaway to the outside of the battery cell 21. As shown in FIG. 3, under normal use conditions of the battery cell 21, the first pressure relief mechanism 215 may be provided at the top of the battery cell 21, that is, on an end cover 212 of the battery cell 21, the first pressure relief mechanism 215 may alternatively be provided on a sidewall of a shell 211 of the battery cell 21, and the first pressure relief mechanism 215 may alternatively be provided at the bottom of the shell 211 of the battery cell 21.

The second pressure relief mechanism 16, when actuated, can release the emissions released by the battery cell 21 into the pressure relief channel 30 to the outside of the box 10, where the second pressure relief mechanism 16 may be provided on a top cover 13, a frame 14, or a bottom plate 15 of the box 10. The operating principles of the first pressure relief mechanism 215 and the second pressure relief mechanism 16 are similar and will not be repeated herein.

The pressure relief channel 30 connects the first pressure relief mechanism 215 of at least one battery cell 21 and the second pressure relief mechanism 16, meaning that when the first pressure relief mechanism 215 and the second pressure relief mechanism 16 connected to the pressure relief channel 30 are actuated simultaneously, the pressure relief channel 30 can communicate the corresponding first pressure relief mechanism 215 with the second pressure relief mechanism 16. As a result, the emissions released by the first pressure relief mechanism 215 can move to the second pressure relief mechanism 16 and be discharged outside the battery 1100 through the second pressure relief mechanism 16. Additionally, when there is one battery cell 21, the pressure relief channel 30 connects the first pressure relief mechanism 215 of the battery cell 21 and the second pressure relief mechanism 16; and when there are a plurality of battery cells 21, the number of battery cells 21 connected to the pressure relief channel 30 includes, but is not limited to, one, two, three, or four.

In the battery 1100 of the embodiment of this application, when a battery cell 21 inside the battery 1100 undergoes thermal runaway, the first pressure relief mechanism 215 is actuated, and the emissions generated by the battery cell 21 are released into the pressure relief channel 30 through the first pressure relief mechanism 215 and move along the pressure relief channel 30 to the second pressure relief mechanism 16. As the thermal runaway intensifies, the second pressure relief mechanism 16 is actuated, and the emissions in the pressure relief channel 30 are released to the outside of the box 10 through the second pressure relief mechanism 16. This reduces the temperature and pressure inside the box 10, which helps reduce the risk of severe damage to the box 10 and enhance the reliability of the battery 1100 during use.

In another embodiment of this application, as shown in FIG. 6 to FIG. 9, the pressure relief channel 30 further includes a first sub-pressure relief channel 31 configured to be connected to the second pressure relief mechanism 16, and the battery 1100 further includes a partition 50, where the partition 50 is configured to separate the battery module 20 from the first sub-pressure relief channel 31, the partition 50 is provided with a plurality of first ventilatable structures 51, and each first ventilatable structure 51 connects the first pressure relief mechanism 215 of at least one battery cell 21 and the first sub-pressure relief channel 31.

The first sub-pressure relief channel 31 may be a channel that can be connected to the second pressure relief mechanism 16, and after the emissions released by the battery cell 21 enter the first sub-pressure relief channel 31, the emissions can move along the first sub-pressure relief channel to the second pressure relief mechanism 16.

The partition 50 may refer to a component that can separate the battery module 20 and the first sub-pressure relief channel 31. In some embodiments, the partition 50 may be a baffle, a liquid cooling plate, or other structures capable of separating the battery module 20 and the first sub-pressure relief channel 31.

The first ventilatable structure 51 may be a ventilatable structure that can connect the first sub-pressure relief channel 31 and the first pressure relief mechanism 215, and the emissions released by the first pressure relief mechanism 215 can enter the first sub-pressure relief channel 31 through the first ventilatable structure 51. The first ventilatable structure 51 may be a through hole, a vent valve, or the like. However, it is not limited thereto. In some embodiments, the first ventilatable structure 51 may be a weak region provided on the partition 50, and when the first pressure relief mechanism 215 is actuated, the weak region can be destroyed, so that the first pressure relief mechanism 215 is communicated with the first sub-pressure relief channel 31.

Each first ventilatable structure 51 connects the first pressure relief mechanism 215 of at least one battery cell 21 and the first sub-pressure relief channel 31, meaning that when there is one battery cell 21, the first ventilatable structure 51 connects the first pressure relief mechanism 215 of the battery cell 21 and the first sub-pressure relief channel 31; and when there are a plurality of battery cells 21, the number of battery cells 21 connected to the first ventilatable structure 51 includes, but is not limited to, one, two, three, or four.

By adopting the technical solution of this embodiment, after a battery cell 21 in the battery module 20 undergoes thermal runaway, the emissions released by the first pressure relief mechanism 215 of the battery cell 21 enter the first sub-pressure relief channel 31 through the first ventilatable structure 51, and the first sub-pressure relief channel 31 is separated from the battery module 20 by the partition 50, which can reduce the risk of contact between the emissions in the first sub-pressure relief channel 31 and other battery cells 21 in the battery module 20, thereby reducing the risk of thermal runaway propagation and helping enhance the reliability of the battery 1100 during use.

Figure 10:
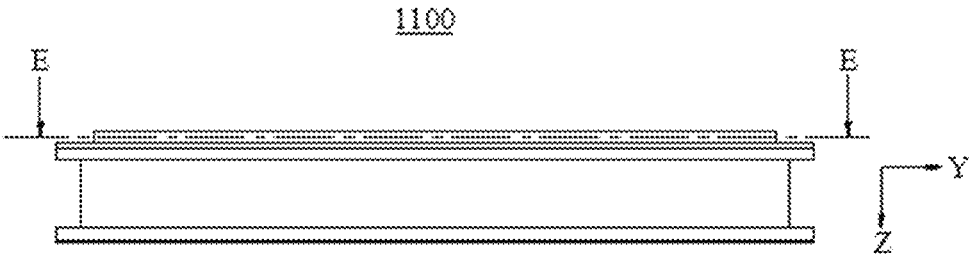
FIG. 10 is a schematic structural diagram of the battery shown in FIG. 4 from another perspective.
Figures 11, 12:
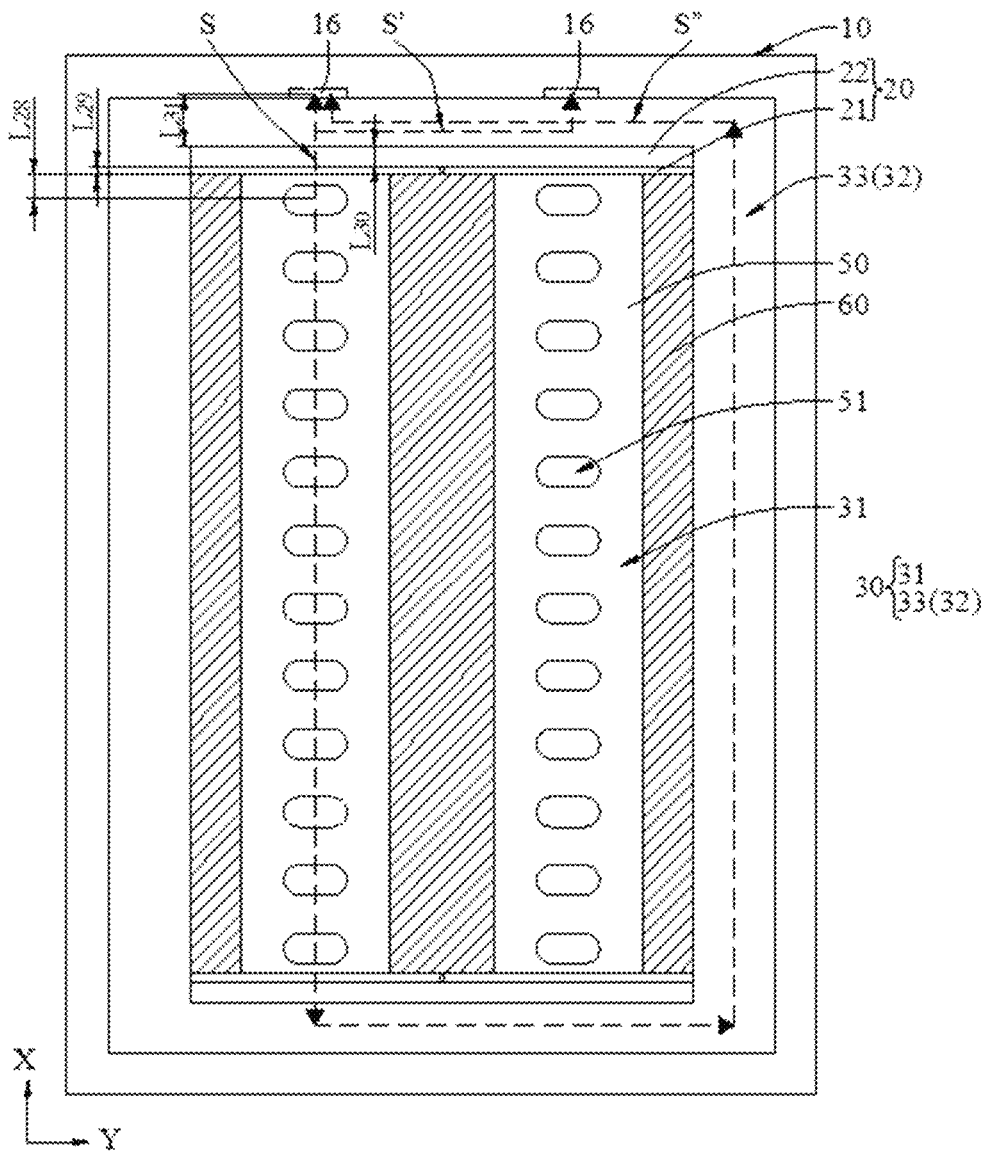
FIG. 11 is a cross-sectional view along line E-E in FIG. 10.
FIG. 12 is a schematic structural diagram of a battery according to yet another embodiment of this application.

In another embodiment of this application, referring to FIG. 10 and FIG. 11 together, the pressure relief channel 30 includes at least two first sub-pressure relief channels 31, each first sub-pressure relief channel 31 connects the first ventilatable structures 51 corresponding to different battery cells 21, and the first sub-pressure relief channels 31 are separated by spacing elements 60.

The number of first sub-pressure relief channels 31 includes, but is not limited to, two, three, four, or five, and each first sub-pressure relief channel 31 connects the first pressure relief mechanisms 215 of different battery cells 21, so that different battery cells 21 can be connected to the second pressure relief mechanism 16 through different first sub-pressure relief channels 31. The spacing element 60 may refer to a component located between two adjacent first sub-pressure relief channels 31 and separating the two adjacent first sub-pressure relief channels 31, so that the two adjacent first sub-pressure relief channels 31 are independent channels.

By adopting the technical solution of this embodiment, when one battery cell 21 undergoes thermal runaway, the emissions released by the battery cell 21 enter the first sub-pressure relief channel 31 connected to the battery cell 21, and the first sub-pressure relief channels 31 are separated by a spacing element 60, so that the emissions are prevented from directly entering other first sub-pressure relief channels 31, which helps reduce the risk of thermal runaway propagation.

Figure 8:
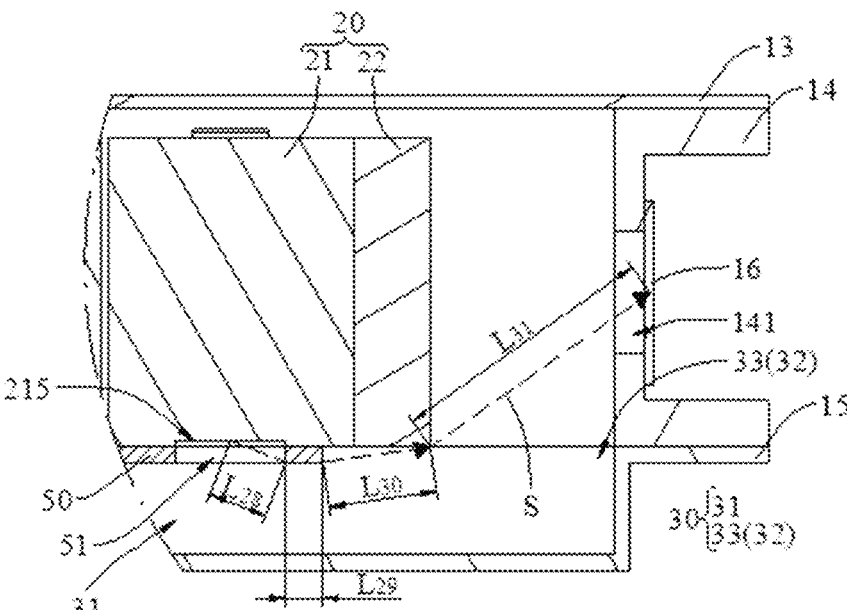
FIG. 8 is a partial enlarged view at location C in FIG. 6.
Figure 9:
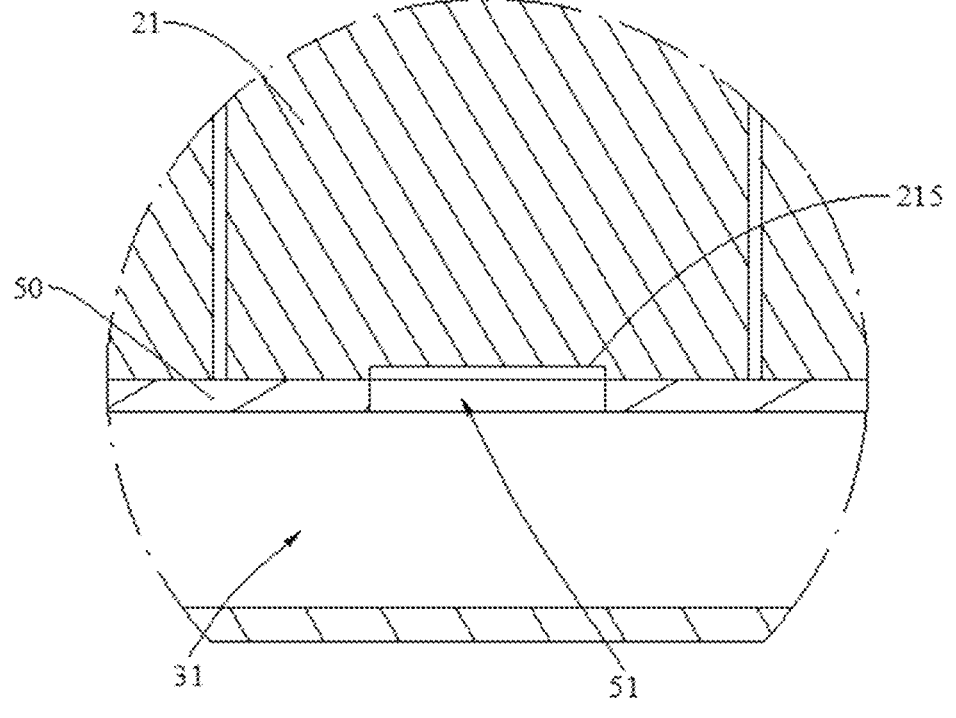
FIG. 9 is a locally enlarged view of a location D in FIG. 6.

In another embodiment of this application, as shown in FIG. 8 and FIG. 11, the pressure relief channel 30 further includes a communication channel 32, a wall surface of the partition 50 and an inner wall surface of the box 10 enclose the communication channel 32, and each first sub-pressure relief channel 31 is connected to the second pressure relief mechanism 16 through the communication channel 32.

The communication channel 32 may refer to a gap space located between the wall surface of the partition 50 and the inner wall surface of the box 10, and the gap space can connect each first sub-pressure relief channel 31 and the second pressure relief mechanism 16, so that the emissions flowing out of each first sub-pressure relief channel 31 can move to the second pressure relief mechanism 16 through the communication channel 32, so as to achieve pressure relief and emission discharge of the battery 1100.

By adopting the technical solution of this embodiment, the communication channel 32 is enclosed by the wall surface of the partition 50 and the inner wall surface of the box 10, resulting in a simple structure that is easy to process and manufacture.

In another embodiment of this application, as shown in FIG. 4 and FIG. 11, the battery module 20 includes at least one row of battery cells 21, each row of battery cells 21 includes at least one battery cell 21, each row of battery cells 21 is correspondingly provided with at least one first sub-pressure relief channel 31, each first sub-pressure relief channel 31 extends along an arrangement direction (direction X) of the corresponding row of battery cells 21; and each first ventilatable structure 51 corresponding to each row of battery cells 21 is connected to the corresponding first sub-pressure relief channel 31.

The battery cells 21 in the battery module 20 are arranged in a matrix. The battery module 20 includes at least one row of battery cells 21, to be specific, the number of rows of battery cells 21 in the battery module 20 includes, but is not limited to, one, two, three, four, or five. The number of first sub-pressure relief channels 31 correspondingly provided for each row of battery cells 21 may be one, two, three, four, or five. The first pressure relief mechanisms 215 of each row of battery cells 21 can be connected to the corresponding first sub-pressure relief channel 31, so that when the battery cell 21 undergoes thermal runaway, the emissions released will enter the corresponding first sub-pressure relief channel 31 through the first ventilatable structure 51 and flow to the second pressure relief mechanism 16, and finally be discharged outside the box 10 through the second pressure relief mechanism 16. For example, the number of rows of battery cells 21 is the same as the number of first sub-pressure relief channels 31, each row of battery cells 21 corresponds to one first sub-pressure relief channel 31, and the first sub-pressure relief channel 31 extends along an arrangement direction (direction X) of the battery cells 21 in the corresponding row and is connected to the first pressure relief mechanism 215 of each battery cell 21 in the corresponding row, so that the emissions released by the battery cell 21 due to thermal runaway will enter the corresponding first sub-pressure relief channel 31 for discharge.

By adopting the technical solution of this embodiment, when a battery cell 21 undergoes thermal runaway, the emissions released by the battery cell 21 enter the corresponding first sub-pressure relief channel 31 for discharge, so that the emissions are prevented from entering other first sub-pressure relief channels 31 and becoming in contact with other battery cells 21, reducing the risk of thermal runaway propagation and improving the reliability of the battery cells 21.

In another embodiment of this application, as shown in FIG. 11, the second pressure relief mechanism 16 is located on a side of an end portion of the battery module 20 along an extension direction (direction X) of the first sub-pressure relief channel 31.

The second pressure relief mechanism 16 is installed on the box 10 and located on a side of an end portion of the battery module 20 along the extension direction (direction X) of the first sub-pressure relief channel 31, to be specific, the second pressure relief mechanism 16 is located on a side of an end outlet of the first sub-pressure relief channel 31, so that the emissions in the first sub-pressure relief channel 31 can be directly discharged from the second pressure relief mechanism 16 outside the battery 1100 after being discharged from an end opening of the first sub-pressure relief channel 31.

By adopting the technical solution of this embodiment, after a battery cell 21 undergoes thermal runaway, the emissions in the first sub-pressure relief channel 31 can be quickly discharged to the second pressure relief mechanism 16, resulting in good pressure relief and exhaust effects for the battery 1100.

In another embodiment of this application, as shown in FIG. 11, the communication channel 32 is an annular channel 33, and the annular channel 33 is arranged around the partition 50.

The communication channel 32 is annular and is arranged around the partition 50.

Typically, the emissions released by the second pressure relief mechanism 16 contain a large amount of particulate matter. If the temperature of the particulate matter released by the second pressure relief mechanism 16 is high, the exhaust temperature of the battery 1100 becomes excessive, which easily deteriorates the external environment of the battery 1100 and severely affects the reliability of the battery 1100 during use.

By adopting the technical solution of this embodiment, the emissions discharged from the first sub-pressure relief channel 31 enter the annular channel 33 and flow along the annular channel 33, so that the discharge path can be extended and thus the cooling time of particulate matter in the emissions can be prolonged, resulting in a low temperature of the particulate matter when discharged outside the battery 1100, which helps reduce the exhaust temperature of the battery 1100 and enhance the reliability of the battery 1100 during use.

Figure 13:
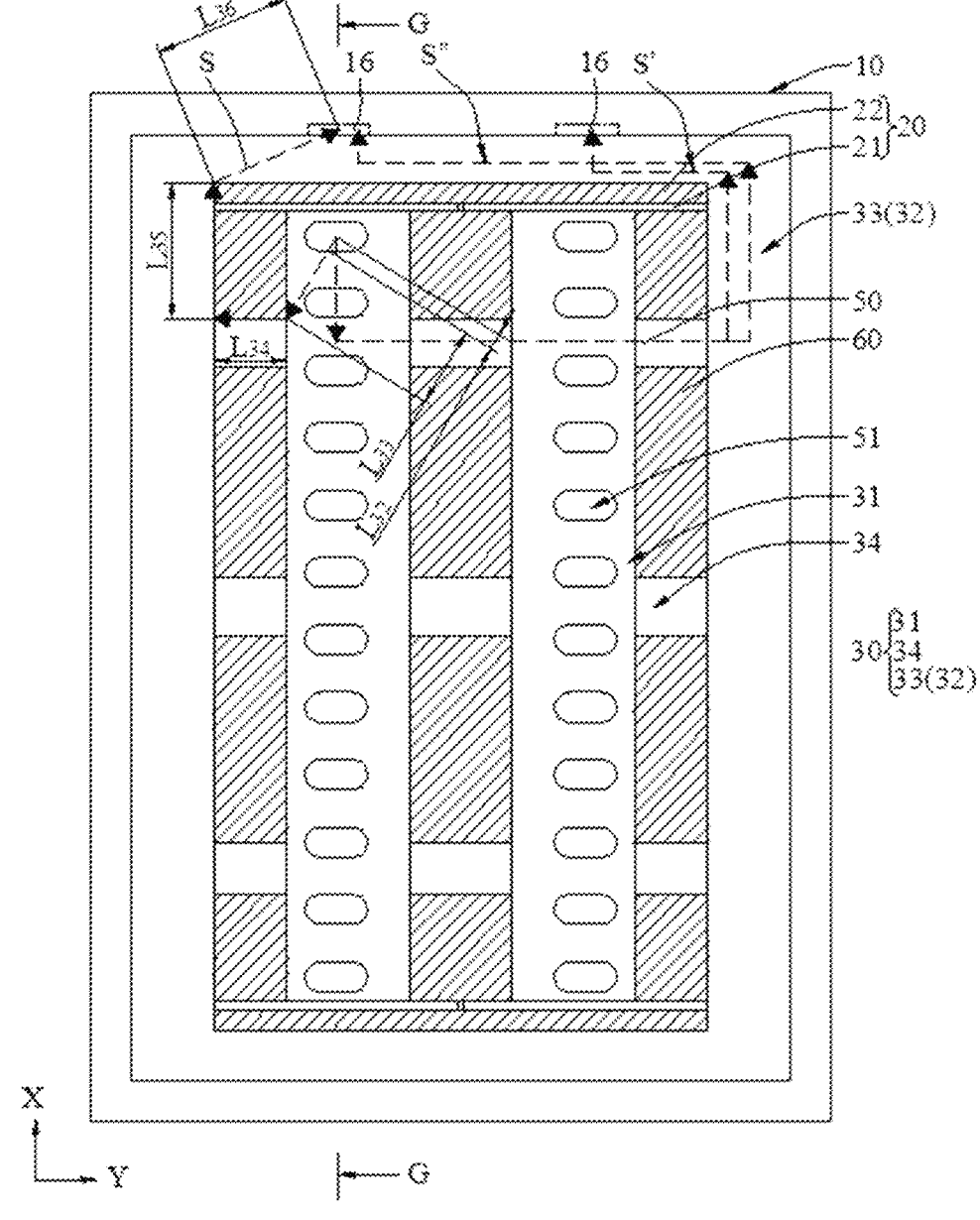
FIG. 13 is a cross-sectional view along line F-F in FIG. 12.
Figure 14:
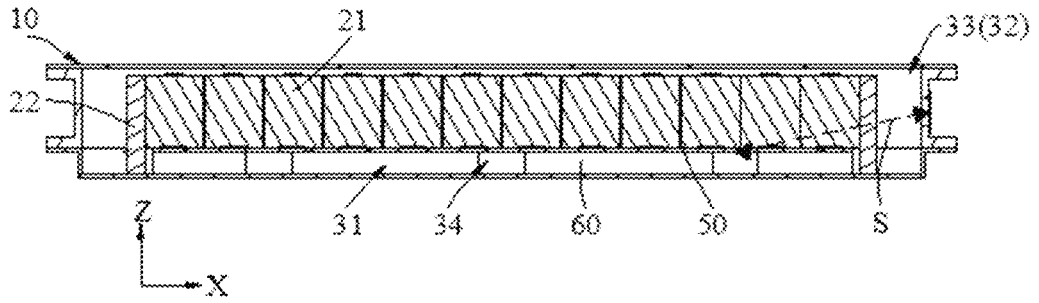
FIG. 14 is a cross-sectional view along line G-G in FIG. 13.

In another embodiment of this application, as shown in FIG. 12 to FIG. 14, an end plate 22 is provided at each of two ends of at least one row of battery cells 21, the end plates 22 are inserted into the annular channel 33 and sealingly connected to the inner wall surface of the box 10; and the pressure relief channel 30 further includes a second sub-pressure relief channel 34, where the second sub-pressure relief channel 34 intersects with the first sub-pressure relief channel 31, and the second sub-pressure relief channel 34 is configured to connect the corresponding first sub-pressure relief channel 31 and the annular channel 33.

The end plate 22 may refer to a component configured to fix the corresponding row of battery cells 21 and be located at an end of the corresponding row of battery cells 21, and the end plate 22 and the battery cells 21 can be connected through screwing, snapping, or bonding.

The end plates 22 are inserted into the annular channel 33 and sealingly connected to the inner wall surface of the box 10, meaning that a sealing structure can be formed between the end plates 22 and the inner wall surface of the box 10, and the end plates 22 and the wall surface of the box 10 can be sealed through welding, sealant, sealing ring, or other sealing forms; the sealing structure separates the first sub-pressure relief channel 31 from the second pressure relief mechanism 16, so that the emissions in the first sub-pressure relief channel 31 cannot directly move to the second pressure relief mechanism 16; and the pressure relief channel 30 further includes a second sub-pressure relief channel 34, where the second sub-pressure relief channel 34 may be a channel intersecting with the first sub-pressure relief channel 31, so that the second sub-pressure relief channel 34 can extend to a side of the first sub-pressure relief channel 31, and the first sub-pressure relief channel is communicated with the annular channel 33. In this way, the emissions in the first sub-pressure relief channel 31 flow into the annular channel 33 through the second sub-pressure relief channel 34 and finally flow to the second pressure relief mechanism 16, so as to be discharged outside the box 10.

By adopting the technical solution of this embodiment, the emissions released by the battery cell 21 need to pass through the first sub-pressure relief channel 31, the second sub-pressure relief channel 34, and the annular channel 33 before flowing to the second pressure relief mechanism 16 and finally being discharged outside the battery 1100, so that the discharge path can be extended and the cooling time of particulate matter in the emissions can be prolonged, which helps reduce the risk of excessive exhaust temperature of the battery 1100.

In another embodiment of this application, as shown in FIG. 12 to FIG. 14, the end plate 22 is provided at each of two ends of each row of battery cells 21, and each first sub-pressure relief channel 31 is communicated with the second sub-pressure relief channel 34.

The end plates 22 at the two ends of each row of battery cells 21 are inserted into the annular channel 33 and sealingly connected to a sidewall of the box 10, so that the end plates 22 are connected to the sidewall of the box 10 and form a sealing structure. In this way, the emissions discharged from each first sub-pressure relief channel 31 can be discharged into the annular channel 33 through the second sub-pressure relief channel 34. Additionally, in the battery module 20, at least some of the end plates 22 at the same end may be, but are not limited to, connected into an integral structure through bolting, bonding, snapping, riveting, welding, or integral molding, making the connection of the battery cells 21 in the battery module 20 tighter. Integral molding refers to the process of manufacturing a product into a single piece using an integral process such as extrusion, injection molding, or die casting.

By adopting the technical solution of this embodiment, when any battery cell 21 in the battery cells 21 undergoes thermal runaway, the emissions released by the battery cell 21 flow into the annular channel 33 through the corresponding first sub-pressure relief channel 31 and second sub-pressure relief channel 34, then flow through the annular channel 33 to the second pressure relief mechanism 16, and are released to the outside of the battery 1100 through the second pressure relief mechanism 16, which helps enhance the reliability of the battery 1100 during use.

In another embodiment of this application, as shown in FIG. 12 to FIG. 14, the pressure relief channel 30 includes a plurality of second sub-pressure relief channels 34, and the second sub-pressure relief channels 34 are separated by the spacing elements 60.

The plurality of second sub-pressure relief channels 34 means that the number of second sub-pressure relief channels 34 includes, but is not limited to, two, three, or four. Two adjacent second sub-pressure relief channels 34 are separated by the spacing elements 60, meaning that two adjacent second sub-pressure relief channels 34 are not directly connected; additionally, the spacing elements 60 simultaneously separate two adjacent first sub-pressure relief channels 31 and two adjacent second sub-pressure relief channels 34, resulting in good structural compactness of the entire battery 1100.

By adopting the technical solution of this embodiment, the design of a plurality of second sub-pressure relief channels 34 allows the emissions in the first sub-pressure relief channel to be discharged through the plurality of second sub-pressure relief channels 34, which facilitates rapid discharge of the emissions, reduces the risks of internal pressure buildup and excessive temperature in the box 10, and enhances the reliability of the battery 1100 during use.

In another embodiment of this application, as shown in FIG. 12 to FIG. 14, the plurality of second sub-pressure relief channels 34 are spaced apart from each other along the extension direction (direction X) of the first sub-pressure relief channel 31.

It can be understood that the extension direction (direction X) of the first sub-pressure relief channel may refer to the arrangement direction (direction X) of the battery cells 21 in one row of battery cells 21.

By adopting the technical solution of this embodiment, the battery cells 21 arranged along the extension direction (direction X) of the first sub-pressure relief channel 31 can quickly discharge the emissions released by the battery cells 21 into the annular channel 33 through the corresponding second sub-pressure relief channels 34, and finally release the emissions to the outside of the box 10 through the second pressure relief mechanism 16, which reduces the risks of internal pressure buildup and excessive temperature in the box 10, and helps enhance the reliability of the battery 1100 during use.

In another embodiment of this application, as shown in FIG. 12 to FIG. 14, the first sub-pressure relief channel 31 and the second sub-pressure relief channel 34 are perpendicular to each other.

The first sub-pressure relief channel 31 and the second sub-pressure relief channel 34 are perpendicular to each other, meaning that the first sub-pressure relief channel 31 and the second sub-pressure relief channel 34 are arranged vertically and horizontally. For example, the spacing elements 60 are arranged in a matrix, the first sub-pressure relief channel 31 is formed between two adjacent columns of spacing elements 60, and the second sub-pressure relief channel 34 is formed between two adjacent rows of spacing elements 60.

By adopting the technical solution of this embodiment, the first sub-pressure relief channel 31 and the second sub-pressure relief channel 34 are arranged in a regular pattern, facilitating processing and manufacturing.

In another embodiment of this application, as shown in FIG. 15 to FIG. 19, the annular channel 33 is provided with an annular member 70 connected to the box 10, where the annular member 70 is configured to divide the annular channel 33 into a first sub-annular channel 331 and a second sub-annular channel 332, the second sub-annular channel 332 is arranged around the first sub-annular channel 331; the annular member 70 is provided with a second ventilatable structure 71 configured to connect the first sub-annular channel 331 and the second sub-annular channel 332, the second sub-annular channel 332 is connected to the second pressure relief mechanism 16, and the first sub-annular channel 331 is in communication with the first sub-pressure relief channel 31.

The annular member 70 may refer to an annular component located within the annular channel 33 and extending along a circumferential direction of the annular channel 33, and the annular member 70 is connected to the box 10, where the box 10 serves as a mounting base for the annular member 70. Moreover, the annular member 70 can divide the annular channel 33 into a first sub-annular channel 331 and a second sub-annular channel 332, where the first sub-annular channel 331 is located inside the second sub-annular channel 332, in other words, the second sub-annular channel 332 surrounds the first sub-annular channel 331. The shape of the annular member 70 matches the shape of the annular channel 33; and the shape of the annular member 70 may be various, such as circular, triangular, elliptical, quadrilateral, and others.

The second ventilatable structure 71 may refer to a structure capable of connecting the first sub-annular channel 331 and the second sub-annular channel, where the second ventilatable structure 71 may be a through hole, a vent valve, a pressure relief valve, or other structures.

The second sub-annular channel 332 is connected to the second pressure relief mechanism 16, and the first sub-annular channel 331 is communicated with the first sub-pressure relief channel 31, meaning that when the second pressure relief mechanism 16 is actuated, the emissions released by the battery cell 21 first enter the first sub-annular channel 331, then enter the second sub-annular channel 332 through the second ventilatable structure 71, and finally are released to the outside of the box 10 through the second pressure relief mechanism 16.

By adopting the technical solution of this embodiment, the emissions released by the battery cell 21 need to pass through the first sub-annular channel 331 and the second sub-annular channel 332, so that the discharge path can be extended and the cooling time of particulate matter in the emissions can be prolonged, which helps reduce the risk of excessive exhaust temperature outside the battery 1100 and enhance the reliability of the battery 1100 during use.

Figure 18:
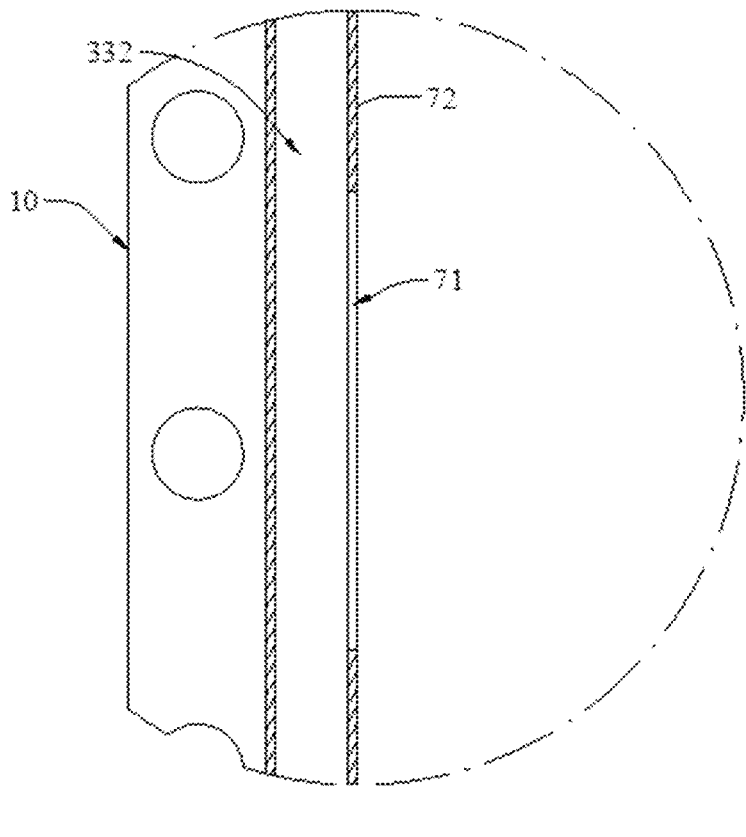
FIG. 18 is a partial enlarged view at location J in FIG. 16.
Figure 19:
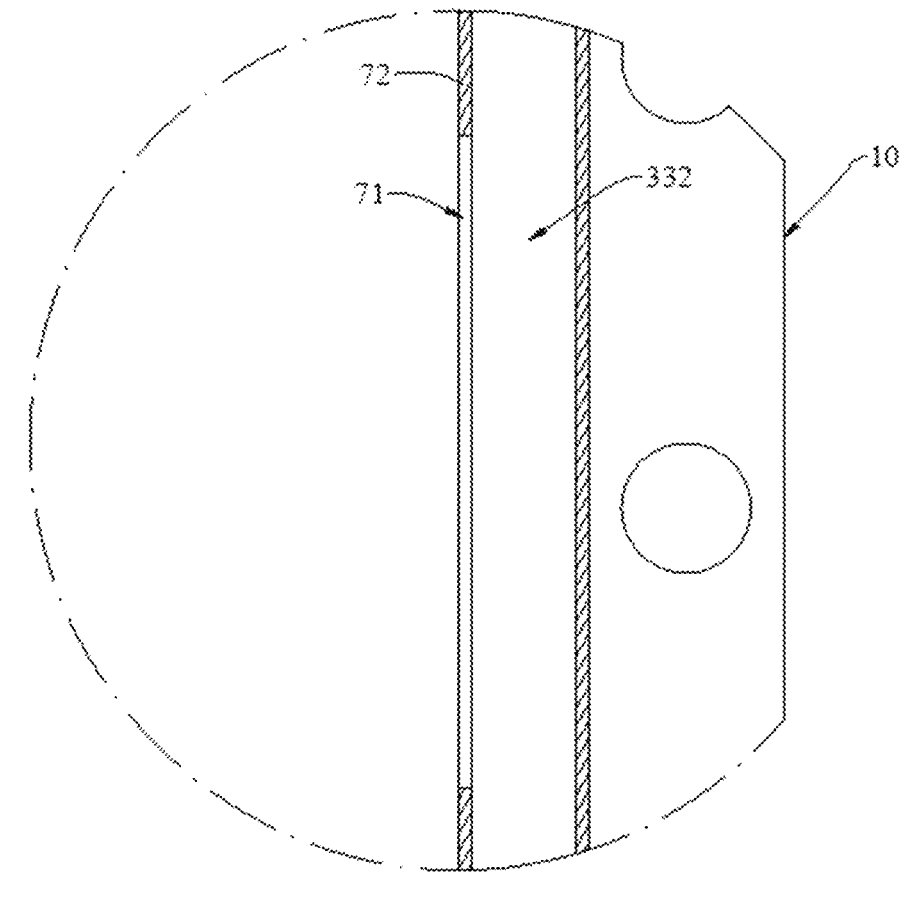
FIG. 19 is a partial enlarged view at location K in FIG. 16.

In another embodiment of this application, as shown in FIG. 18 and FIG. 19, the second ventilatable structure 71 is a through hole.

The through hole may refer to a hole structure penetrating the annular member 70.

By adopting the technical solution of this embodiment, the second ventilatable structure 71 being a through hole has a simple structure and is easy to process and manufacture.

Figure 16:
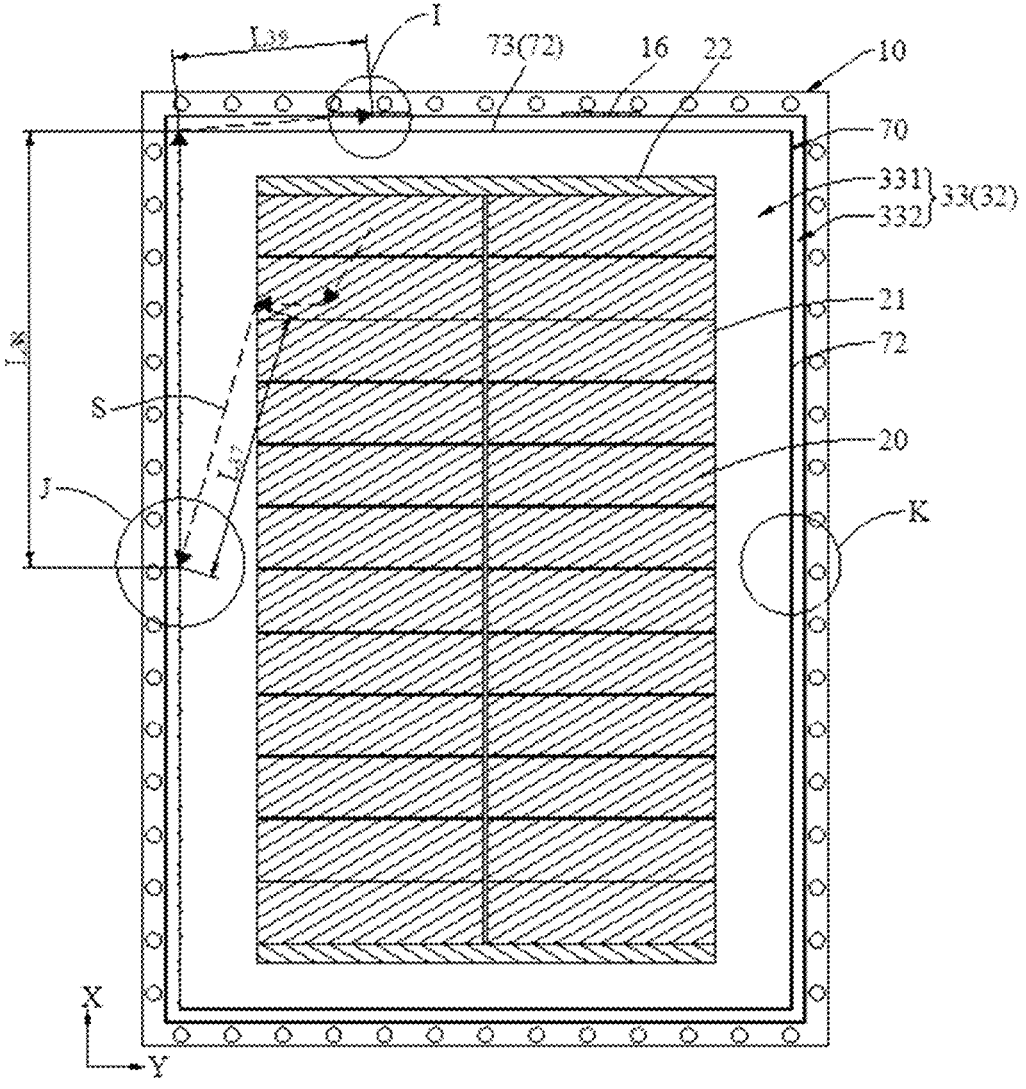
FIG. 16 is a cross-sectional view along line H-H in FIG. 15.
Figure 17:
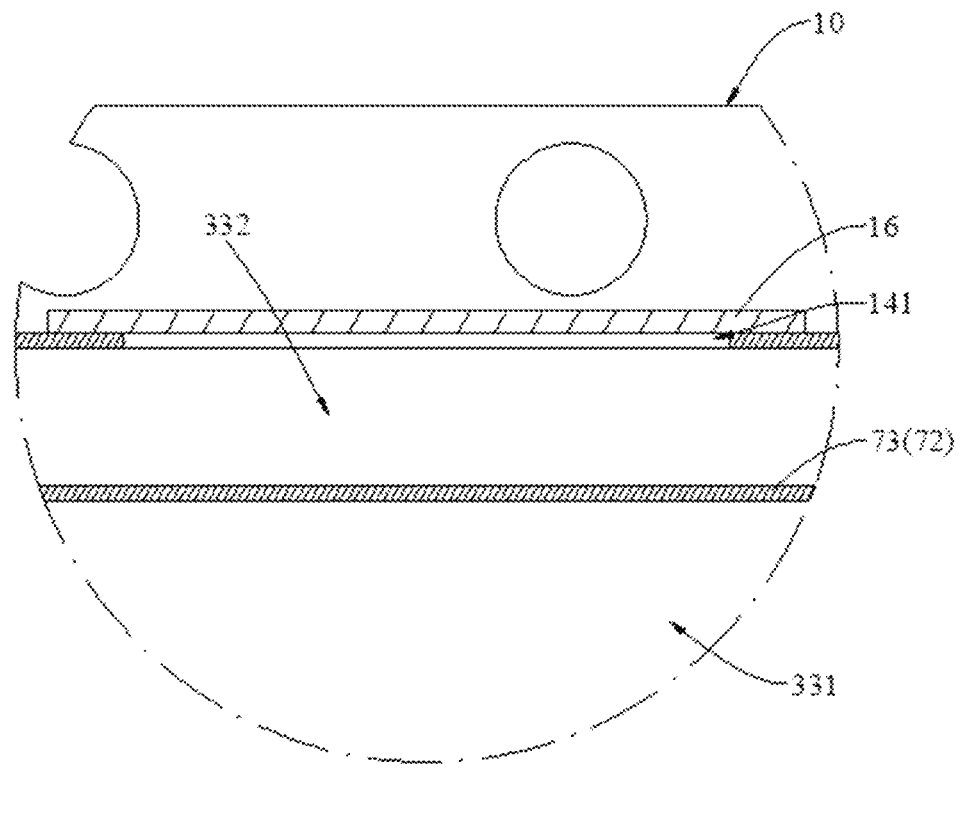
FIG. 17 is a partial enlarged view at location I in FIG. 16.

In another embodiment of this application, as shown in FIG. 16, FIG. 18, and FIG. 19, the annular member 70 includes at least three sidewall portions 72 sequentially connected end-to-end, and the sidewall portion 72 farthest from the second pressure relief mechanism 16 is provided with the second ventilatable structure 71.

The sidewall portion 72 farthest from the second pressure relief mechanism 16 may refer to the sidewall portion 72 excluding the sidewall portion 72 closest to the second pressure relief mechanism 16.

By adopting the technical solution of this embodiment, since the second ventilatable structure 71 is farther from the second pressure relief mechanism 16, the emissions passing through the second ventilatable structure 71 need to travel a certain distance to reach the second pressure relief mechanism 16 and be discharged from the box 10, so that the discharge path can be extended and the cooling time of particulate matter in the emissions can be prolonged, resulting in a low temperature of the particulate matter when discharged from the box, which helps reduce the risk of excessive exhaust temperature outside the battery 1100 and enhance the reliability of the battery 1100 during use.

In another embodiment of this application, as shown in FIG. 16, FIG. 18, and FIG. 19, the sidewall portion 72 closest to the second pressure relief mechanism 16 is a first sidewall portion 73, and at least one of the sidewall portion 72 adjacent to the first sidewall portion 73 and the sidewall portion 72 opposite the first sidewall portion 73 is provided with the second ventilatable structure 71.

The first sidewall portion 73 may refer to the sidewall portion 72 closest to the second pressure relief mechanism 16.

The sidewall portion 72 adjacent to or opposite the first sidewall portion 73 may be the sidewall portion 72 farthest from the second pressure relief mechanism 16.

At least one of the sidewall portion 72 adjacent to the first sidewall portion 73 and the sidewall portion 72 opposite the first sidewall portion 73 is provided with the second ventilatable structure 71, meaning that the sidewall portion 72 adjacent to the first sidewall portion 73 is provided with the second ventilatable structure 71, or the sidewall portion 72 opposite the first sidewall portion 73 is provided with the second ventilatable structure 71, or the sidewall portion 72 adjacent to the first sidewall portion 73 and the sidewall portion 72 opposite the first sidewall portion 73 each are provided with the second ventilatable structure 71.

By adopting the technical solution of this embodiment, the second ventilatable structure 71 is designed to be far from the second pressure relief mechanism 16, so that the discharge path can be extended and the cooling time of particulate matter in the emissions can be prolonged, which helps reduce the risk of excessive exhaust temperature outside the battery 1100.

In another embodiment of this application, as shown in FIG. 16, FIG. 18, and FIG. 19, the second ventilatable structure 71 is located at a middle portion of the corresponding sidewall portion 72.

The second ventilatable structure 71 IS located at a middle portion of the corresponding sidewall portion 72, meaning that the second ventilatable structure 71 is located at an intermediate position of the corresponding sidewall portion 72.

By adopting the technical solution of this embodiment, the second ventilatable structure 71 being located at the middle portion of the sidewall portion 72 ensures that the distances from the battery cells 21 at two ends to the second ventilatable structure 71 are not too far, and the emissions released by the battery cells 21 at the ends can also be quickly discharged, which helps enhance the reliability of the battery 1100 during use.

Figure 6:
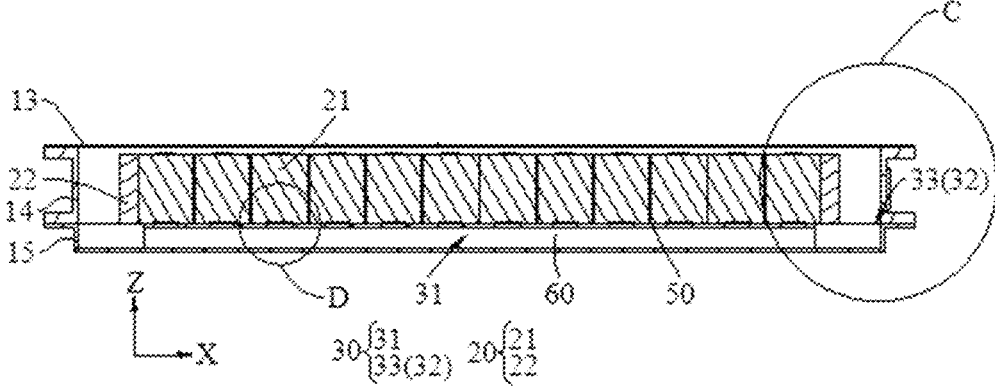
FIG. 6 is a cross-sectional view along line A-A in FIG. 5.
Figure 7:
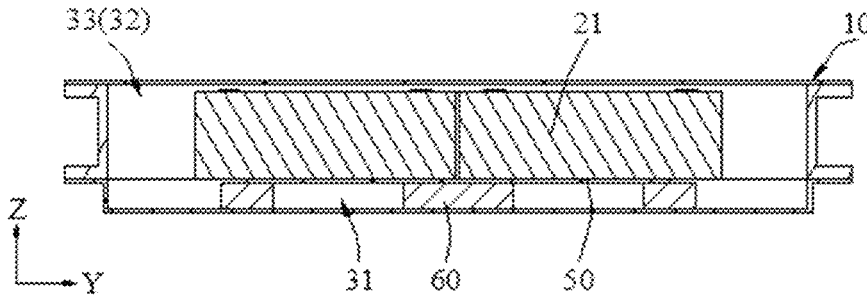
FIG. 7 is a cross-sectional view along line B-B in FIG. 5.

In another embodiment of this application, as shown in FIG. 4, FIG. 6, and FIG. 7, the box 10 further includes a bottom plate 15, the partition 50 is supported on the bottom plate 15 by the spacing element 60, the battery module 20 is located above the partition 50, and the first pressure relief mechanism 215 is located at a bottom of the battery cell 21.

In the use state of the battery 1100, the bottom plate 15 may be a plate at the bottom of the box 10, the partition 50 is supported on the bottom plate 15 by the spacing element 60, and the spacing element 60 lifts up the partition 50, creating a gap between the partition 50 and the bottom plate 15, which facilitates the construction of the first sub-pressure relief channel 31 between the partition 50 and the bottom plate 15.

By adopting the technical solution of this embodiment, the first pressure relief mechanism 215 is located at the bottom of the battery cell 21, and the battery module 20 is separated from the first sub-pressure relief channel 31 by the partition 50. In this way, it is difficult for the emissions released by the first pressure relief mechanism 215 to become into contact with the electrical components at the top of the battery cell 21, which reduces the risk of damage to the battery cell 21 and helps enhance the reliability of the battery 1100 during use.

In another embodiment, the first pressure relief mechanism 215 may alternatively be located at a side of the battery cell 21, or the first pressure relief mechanism 215 may be located at the top of the battery cell 21, and then the partition 50, the spacing elements 60, the first sub-pressure relief channel 31, and the second sub-pressure relief channel 34 are designed accordingly based on the position of the first pressure relief mechanism 215. The first pressure relief mechanism 215 can be specifically designed according to actual needs.

In another embodiment of this application, the partition 50 is a thermal management component, where the thermal management component is configured to exchange heat with the battery module 20.

The thermal management component may be a component that exchanges heat with the battery cell 21, such as a liquid cooling plate or other components.

By adopting the technical solution of this embodiment, the partition 50 being directly a thermal management component eliminates the need for additional components, which helps reduce the number of parts in the battery 1100 and facilitates processing and manufacturing.

In another embodiment of this application, as shown in FIG. 8 and FIG. 11, a pressure relief area of the second pressure relief mechanism 16 is S, and a length of a shortest discharge path formed between the first pressure relief mechanism 215 of at least one battery cell 21 and the second pressure relief mechanism 16 is L; and 0.25 dm$^{-1}$ s<250 dm$^{-1}$, where a unit of S is dm$^2$, and a unit of L is dm.

The pressure relief area S of the second pressure relief mechanism 16 may be a maximum flow area through which emissions pass through the second pressure relief mechanism 16 when the second pressure relief mechanism 16 is in a fully open state. For example, the second pressure relief mechanism 16 is an explosion-proof sheet, the box 10 is typically provided with a pressure relief hole 141, and the explosion-proof sheet covers the pressure relief hole 141; when the explosion-proof sheet is completely damaged, if an area of a damaged region of the explosion-proof sheet is less than a cross-sectional area of the pressure relief hole 141, the area of the damaged region of the explosion-proof sheet is the pressure relief area of the second pressure relief mechanism 16, or if the area of the damaged region of the explosion-proof sheet is greater than the cross-sectional area of the pressure relief hole 141, a cross-sectional area of the pressure relief hole 141 is the pressure relief area of the second pressure relief mechanism 16; when the explosion-proof sheet is completely separated from the box 10, the cross-sectional area of the pressure relief hole 141 is the pressure relief area of the second pressure relief mechanism 16. The second pressure relief mechanism 16 is an explosion-proof valve, and the maximum exhaust area specified in the technical specification of the explosion-proof valve is the pressure relief area of the second pressure relief mechanism 16; and when the pressure relief area is not specified in the technical specification of the explosion-proof valve, the pressure relief area of the second pressure relief mechanism 16 may be the maximum flow area through which emissions flow through the explosion-proof valve when the explosion-proof valve is in a fully open state.

The length L of the shortest discharge path between the first pressure relief mechanism 215 of at least one battery cell 21 and the second pressure relief mechanism 16 means that among a plurality of discharge paths along which the emissions released by the first pressure relief mechanism 215 of the battery cell 21 flow to the second pressure relief mechanism 16, the length of the shortest discharge path is L.

In general, when the battery cell 21 undergoes thermal runaway, a smaller pressure relief area S of the battery 1100 causes more difficult to relieve the pressure in the battery 1100, and higher air pressure inside the battery 1100, resulting in a faster ejection speed of high-temperature particulate matter after thermal runaway, a shorter cooling time for the particulate matter, and a greater risk of excessive exhaust temperature of the battery 1100. If the discharge path of the emissions inside the box 10 is longer, the cooling time of the particulate matter is longer. In this way, the temperature of the particulate matter discharged from the battery 1100 is lower, and the risk of excessive exhaust temperature of the battery 1100 is also reduced.

By adopting the technical solution of this embodiment, the setting of $$0.25 \text{ dm}^{-1} \le \frac{L}{S} < 250 \text{ dm}^{-1}$$

ensures that the pressure relief area S of the second pressure relief mechanism 16 and the shortest discharge path L of the battery cell 21 have a reasonable design, which reduces the risk of excessive exhaust temperature of the battery 1100 and helps enhance the reliability of the battery 1100 during use. Under the condition that $$\frac{L}{S} < 250 \text{ dm}^{-1}$$

is met, when the length L of the shortest discharge path of the battery cell 21 remains constant, the pressure relief area S of the second pressure relief mechanism 16 is not designed too small, preventing the particulate matter from being discharged at a high speed, thereby increasing the cooling time of the particulate matter inside the box 10, lowering the temperature of the particulate matter discharged from the battery 1100, and reducing the risk of excessive exhaust temperature of the battery 1100. Under the condition that $$\frac{L}{S} \ge 0.25 \text{ dm}^{-1}$$

is met, when the shortest discharge path L of the battery cell 21 remains constant, the pressure relief area S of the second pressure relief mechanism 16 is not designed too large, preventing oxygen from the air outside the battery 1100 from flowing back into the box 10 and becoming in contact with the high-temperature emissions inside the box 10, which would further deteriorate the internal environment of the box 10.

Figures 21, 22:
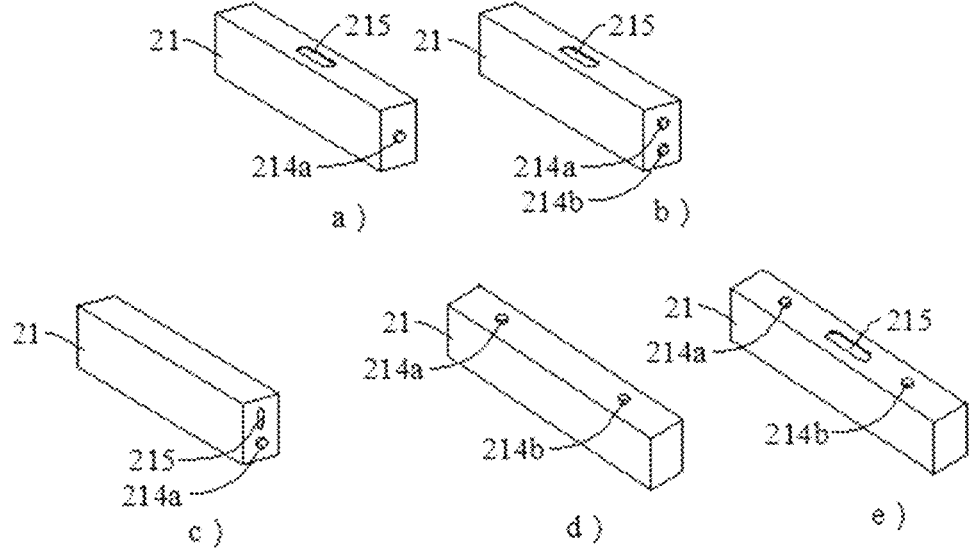
FIG. 21 is a schematic structural diagram of various battery cells according to an embodiment of this application.
FIG. 22 is a schematic exploded view of a battery according to yet another embodiment of this application.

As shown in FIG. 21, in the use state of the battery 1100, typically, the first pressure relief mechanism 215 of the battery cell 21 may be located at the top, side, or bottom of the battery cell 21. For example, when the first pressure relief mechanism 215 is located at the top of the battery cell 21, a positive electrode terminal 214a and a negative electrode terminal 214b of the battery cell 21 may be located at the top of the battery cell 21, or on the same side of the battery cell 21, or respectively on opposite sides of the battery cell 21. When the first pressure relief mechanism 215 is located at a side of the battery cell 21, one of the positive electrode terminal 214a and the negative electrode terminal 214b of the battery cell 21 is located on the same side of the battery cell 21 as the first pressure relief mechanism 215, and the other is located on the opposite side of the battery cell 21 with respect to the first pressure relief mechanism 215; and when the first pressure relief mechanism 215 is located at the bottom of the battery cell 21, the positive electrode terminal 214a and the negative electrode terminal 214b of the battery cell 21 may be located at the top of the battery cell 21.

During the mounting of different types of battery cells 21 in the box 10, the shortest discharge paths of the battery cells 21 vary. The shortest path between the first pressure relief mechanism 215 of the battery cell 21 and the second pressure relief mechanism 16 is described below in combination with some specific embodiments.

Figure 23:
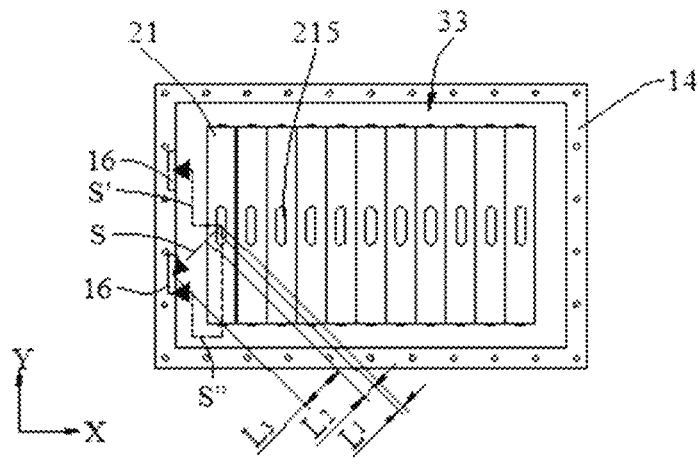
FIG. 23 is a schematic structural diagram of the battery shown in FIG. 22 with the top cover hidden.
Figure 24:
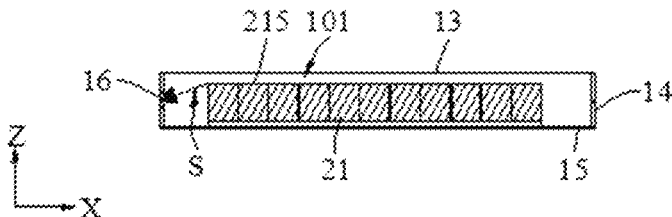
FIG. 24 is a cross-sectional view of the battery shown in FIG. 22.

In a specific embodiment, as shown in FIG. 22 to FIG. 24, the box 10 includes a top cover 13, a frame 14, and a bottom plate 15, where the top cover 13 and the bottom plate 15 respectively cover the upper and lower sides of the frame 14 to enclose an accommodating space for accommodating the battery cells 21, the frame 14 is a rectangular frame 14, the battery module 20 includes one row of battery cells 21, the row of battery cells 21 is arranged along a length direction (direction X) of the box 10, two second pressure relief mechanisms 16 are arranged front and rear on a left wall of the frame 14 of the box 10, a first pressure relief mechanism 215 is provided on the top of each battery cell 21, a first exhaust channel 101 is formed between a top surface of the battery cell 21 and the top cover 13, and an annular channel 33 is enclosed between a peripheral wall of the battery module 20 and an inner peripheral wall of the frame 14. In this way, emissions released by the first pressure relief mechanism 215 flow into the annular channel 33 through the first exhaust channel 101, and then move to the second pressure relief mechanism 16 through the annular channel 33.

For ease of description, the discharge path of the leftmost battery cell 21 is selected as an example for explanation. After the emissions of the battery cell 21 are released, there are a plurality of discharge paths. The dashed arrows in FIG. 23 illustrate a schematic diagram of three discharge paths of the emissions of the battery cell 21 from the first pressure relief mechanism 215 to the second pressure relief mechanism 16. After the first pressure relief mechanism 215 of the battery cell 21 discharges the emissions, the discharge path of the emission moving leftward to the second pressure relief mechanism 16 on the front side is a first discharge path S, the discharge path of the emission moving leftward to the second pressure relief mechanism 16 on the rear side is a second discharge path S', and the discharge path of the emission moving forward to the second pressure relief mechanism 16 on the front side is a third discharge path S". The length of the second discharge path S' and the length of the third discharge path S" are both greater than the length of the first discharge path S, where the first discharge path S may be the shortest discharge path.

The length L of the first discharge path S may be measured by the following method: a projection point of a center of the first pressure relief mechanism 215 on a top surface of the battery cell 21 is a first projection point, a projection point of a center of the second pressure relief mechanism 16 on the top surface of the battery cell 21 is a second projection point, a line connecting the first projection point and the second projection point is a first connecting line, a projection line of a periphery of the first pressure relief mechanism 215 on the top surface of the battery cell 21 is a first projection line, an intersection point of the first connecting line and the first projection line is a first intersection point, an intersection point of the first connecting line and a left side surface of the battery cell 21 is a second intersection point, a distance between the first intersection point and the center of the first pressure relief mechanism 215 is $L_1$, a distance between the first intersection point and the second intersection point is $L_2$, and a distance between the second intersection point and the center of the second pressure relief mechanism 16 is $L_3$, where $L=L_1+L_2+L_3$.

Figure 25:
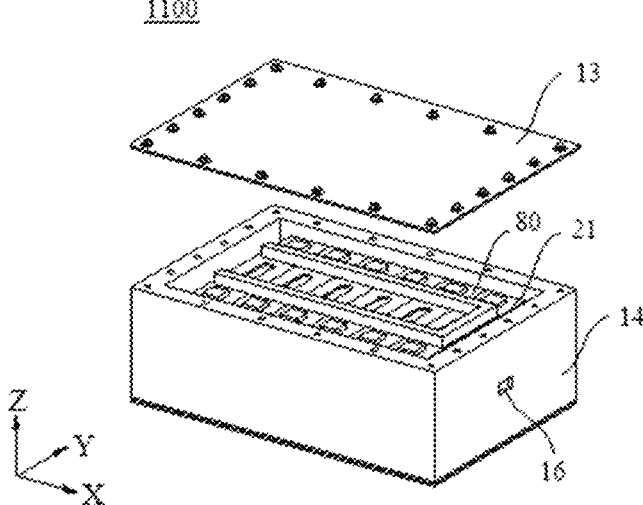
FIG. 25 is a schematic exploded view of a battery according to yet another embodiment of this application.
Figure 26:
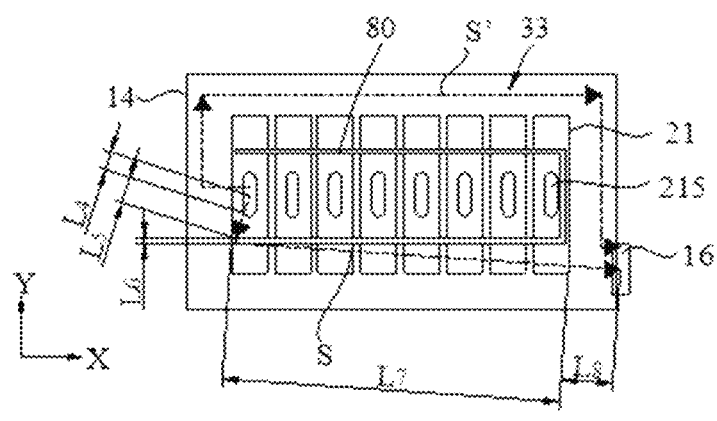
FIG. 26 is a schematic structural diagram of the battery shown in FIG. 25 with the top cover hidden.
Figure 27:
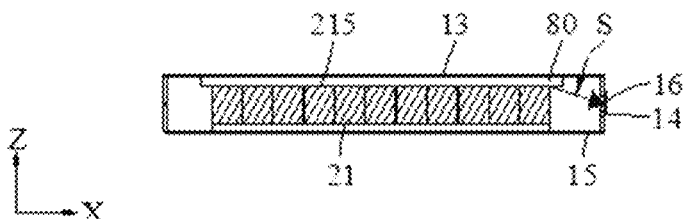
FIG. 27 is a cross-sectional view of the battery shown in FIG. 25.

In a specific embodiment, as shown in FIG. 25 to FIG. 27, this embodiment differs from the previous embodiment in that: the number of the second pressure relief mechanisms 16 is one, the second pressure relief mechanism 16 is located on a right wall of the frame 14, an enclosure member 80 is provided between a top of the battery cell 21 and the top cover 13, the enclosure member 80 surrounds outside the first pressure relief mechanisms 215 of one row of battery cells 21, the enclosure member 80 is U-shaped, and an opening of the enclosure member 80 faces right. In this way, the emissions released by the first pressure relief mechanism 215 flow along a channel enclosed by the enclosure member 80, then flow into the annular channel 33 through the opening of the enclosure member 80, and then flow to the second pressure relief mechanism 16 through the annular channel 33.

For ease of description, the discharge path of the leftmost battery cell 21 is selected as an example for explanation. After the emissions of the battery cell 21 are released, there are a plurality of discharge paths. The dashed arrows in FIG. 26 illustrate a schematic diagram of two discharge paths of the emissions of the battery cell 21 from the first pressure relief mechanism 215 to the second pressure relief mechanism 16. After the emissions released by the first pressure relief mechanism 215 of the battery cell 21 are discharged from the opening of the enclosure member 80, the discharge path of the emissions discharged forward is a first discharge path S; after the emissions are discharged from the opening, the discharge path the emissions discharged rearward is a second discharge path S'; the length of the first discharge path S is less than the length of the second discharge path S', and the first discharge path S may be the shortest discharge path.

The length L of the first discharge path S may be measured by the following method: a projection point of a center of the first pressure relief mechanism 215 on a top surface of the battery cell 21 is a first projection point, a projection point of a center of the second pressure relief mechanism 16 on the top surface of the battery cell 21 is a second projection point, a projection line of a periphery of the first pressure relief mechanism 215 on the top surface of the battery cell 21 is a first projection line, an intersection line of a left wall surface of a front frame bar of the enclosure member 80 and the top surface of the battery cell 21 is a first intersection line, a line connecting a rear endpoint of the first intersection line and the first projection point is a second connecting line, an intersection point of the first projection line and the second connecting line is a third intersection point; a line connecting a front endpoint of the first intersection line and the second projection point is a third connecting line, an intersection point of the third connecting line and a right side surface of the rightmost battery cell 21 is a fourth intersection point; a distance between the center of the first pressure relief mechanism 215 and the third intersection point is $L_4$, a distance between the third intersection point and the rear endpoint of the first intersection line is $L_5$, a length of the first intersection line is $L_6$, a distance between the fourth intersection point and the front endpoint of the first intersection line is $L_7$, and a distance between the center of the second pressure relief mechanism 16 and the fourth intersection point is $L_8$, where $L=L_4+L_5+L_6+L_7+L_8$.

Figure 28:
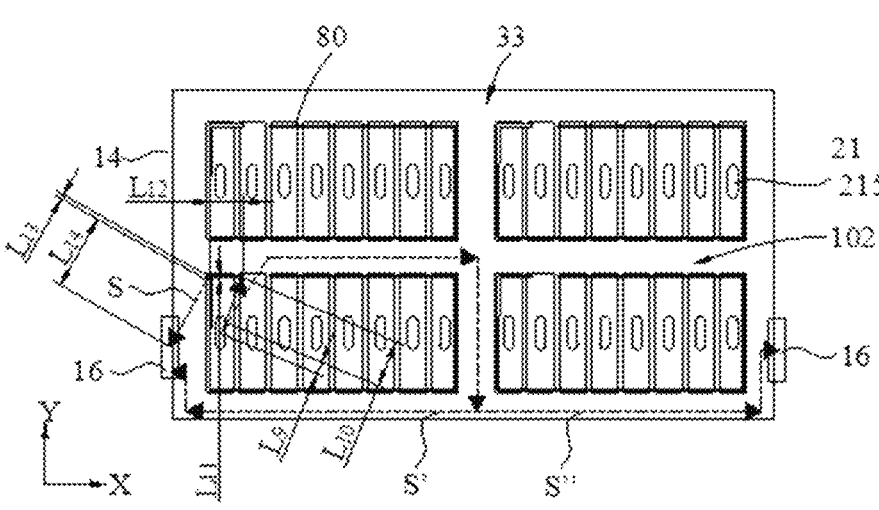
FIG. 28 is a schematic structural diagram of a battery according to yet another embodiment of this application with the top cover hidden.

In a specific embodiment, as shown in FIG. 28, this embodiment differs from the previous embodiment in that: the battery module 20 includes two rows of battery cells 21 distributed front and rear, each row of battery cells 21 is arranged along a length direction (direction X) of the box 10, the two rows of battery cells 21 are arranged along a width direction (direction Y) of the box 10, the two rows of battery cells 21 are divided into four regions: front left, front right, rear left, and rear right, each region is correspondingly provided with an enclosure member 80, the frame 14 is provided with second pressure relief mechanisms 16 on both left and right sides; a rear wall of each enclosure member 80 is provided with an opening, and a second exhaust channel 102 is formed between two adjacent enclosure members 80. In this way, the emissions released by the battery cell 21 due to thermal runaway flow into the second exhaust channel 102 through the opening of the corresponding enclosure member 80, then flow into the annular channel 33 through the second exhaust channel 102, and finally flow to the second pressure relief mechanism 16.

For ease of description, the discharge path of the leftmost and frontmost battery cell 21 is selected as an example for explanation. After the emissions of the battery cell 21 are released, there are a plurality of discharge paths. The dashed arrows in FIG. 28 illustrate a schematic diagram of three discharge paths of the emissions of the battery cell 21 from the first pressure relief mechanism 215 to the second pressure relief mechanism 16. The discharge path of the emissions discharged from the opening of the front-left enclosure member 80 and then discharged leftward to the second pressure relief mechanism 16 on the left side is a first discharge path S; the discharge path of the emissions discharged from the opening of the front-left enclosure member 80 and then discharged rightward to the second pressure relief mechanism 16 on the left side is a second discharge path S', the discharge path of the emissions discharged from the opening of the front-left enclosure member 80 and then discharged rightward to the second pressure relief mechanism 16 on the right side is a third discharge path S", the length of the second discharge path S' and the length of the third discharge path S" are both greater than the length of the first discharge path S, and the first discharge path S may be the shortest discharge path.

The length L of the first discharge path S may be measured by the following method: a projection point of a center of the first pressure relief mechanism 215 on a top surface of the battery cell 21 is a first projection point, a projection point of a center of the second pressure relief mechanism 16 on the top surface of the battery cell 21 is a second projection point, a projection line of a periphery of the first pressure relief mechanism 215 on the top surface of the battery cell 21 is a first projection line, an intersection line of a right wall surface of a left-rear frame bar of the enclosure member 80 and the top surface of the battery cell 21 is a second intersection line, an intersection line of a rear wall surface of the left-rear frame bar of the enclosure member 80 and the top surface of the battery cell 21 is a third intersection line, a line connecting the first projection point and a front endpoint of the second intersection line is a fourth connecting line, an intersection point of the fourth connecting line and the first projection line is a fifth intersection point, a line connecting the second projection point and a left endpoint of the third intersection line is a fifth connecting line, an intersection point of the fifth connecting line and a left side surface of the leftmost battery cell 21 is a sixth intersection point; a distance between the center of the first pressure relief mechanism 215 and the fifth intersection point is $L_9$, a distance between the fifth intersection point and the front endpoint of the second intersection line is $L_{10}$, a length of the second intersection line is Lu, a length of the third intersection line is $L_{12}$, a distance between the sixth intersection point and the left endpoint of the third intersection line is $L_3$, and a distance between the sixth intersection point and the center of the second pressure relief mechanism 16 is $L_{14}$, where $L=L_9+L_{10}+L_{11}+L_{12}+L_{13}+L_{14}$.

Figure 29:
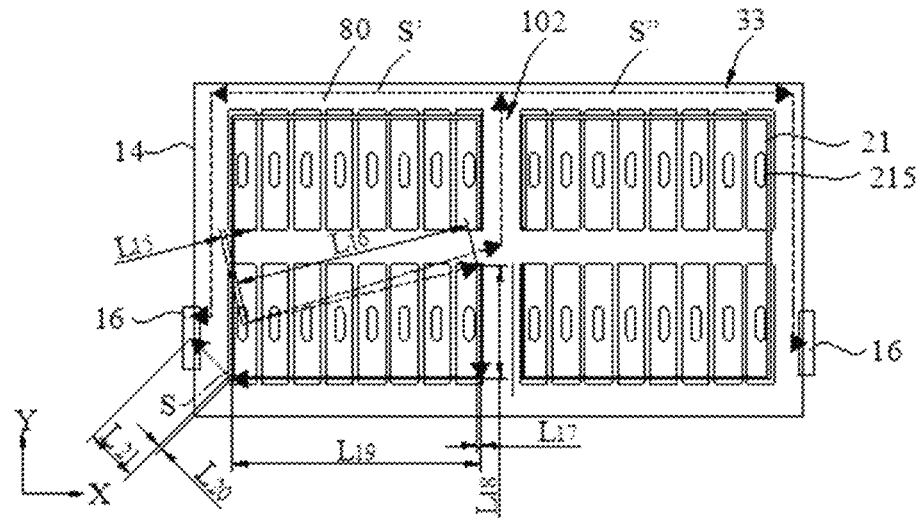
FIG. 29 is a schematic structural diagram of a battery according to yet another embodiment of this application with the top cover hidden.

In a specific embodiment, as shown in FIG. 29, this embodiment differs from the previous embodiment in that: the battery module 20 includes two rows of battery cells 21 distributed front and rear, the two rows of battery cells 21 are divided into two regions: left and right, each region is correspondingly provided with an enclosure member 80, openings of the two enclosure members 80 are arranged opposite each other, the frame 14 is provided with second pressure relief mechanisms 16 on both left and right sides; and a second exhaust channel 102 is formed between two adjacent enclosure members 80. In this way, the emissions released by the battery cell 21 due to thermal runaway flow into the second exhaust channel 102 through the opening of the corresponding enclosure member 80, then flow into the annular channel 33 through the second exhaust channel 102, and finally flow to the second pressure relief mechanism 16.

For ease of description, the discharge path of the leftmost and frontmost battery cell 21 is selected as an example for explanation. After the emissions of the battery cell 21 are released, there are a plurality of discharge paths. The dashed arrows in FIG. 29 illustrate a schematic diagram of three discharge paths of the emissions of the battery cell 21 from the first pressure relief mechanism 215 to the second pressure relief mechanism 16. The discharge path of the emissions discharged from the opening of the left enclosure member 80 and then discharged forward to the second pressure relief mechanism 16 on the left side is a first discharge path S; the discharge path of the emissions discharged from the opening of the left enclosure member 80 and then discharged rearward to the second pressure relief mechanism 16 on the left side is a second discharge path S'; the discharge path of the emissions discharged from the opening of the left enclosure member 80 and then discharged rearward to the second pressure relief mechanism 16 on the right side is a third discharge path S", the length of the second discharge path S' and the length of the third discharge path S" are both greater than the length of the first discharge path S, and the first discharge path S may be the shortest discharge path.

The length L of the first discharge path S may be measured by the following method: a projection point of a center of the first pressure relief mechanism 215 on a top surface of the battery cell 21 is a first projection point, a projection point of a center of the second pressure relief mechanism 16 on the top surface of the battery cell 21 is a second projection point, a projection line of a periphery of the first pressure relief mechanism 215 on the top surface of the battery cell 21 is a first projection line, an intersection line of a rear wall surface of a right-front frame bar of the enclosure member 80 and the top surface of the battery cell 21 is a fourth intersection line, an intersection line of a right wall surface of the right-front frame bar of the enclosure member 80 and the top surface of the battery cell 21 is a fifth intersection line, an intersection line of a front wall surface of a front frame bar of the enclosure member 80 and the top surface of the battery cell 21 is a sixth intersection line, a line connecting the first projection point and a left endpoint of the fourth intersection line is a sixth connecting line, an intersection point of the sixth connecting line and the first projection line is a seventh intersection point, a line connecting the second projection point and a left endpoint of the sixth intersection line is a seventh connecting line, an intersection point of the seventh connecting line and a left side surface of the leftmost-front battery cell 21 is an eighth intersection point; a distance between the center of the first pressure relief mechanism 215 and the seventh intersection point is Lis, a distance between the seventh intersection point and the left endpoint of the fourth intersection line is $L_{16}$, a length of the fourth intersection line is $L_{17}$, a length of the fifth intersection line is Lis, a length of the sixth intersection line is $L_{19}$, a distance between the eighth intersection point and the left endpoint of the sixth intersection line is $L_{20}$, and a distance between the eighth intersection point and the center of the second pressure relief mechanism 16 is $L_{21}$, where $L=L_{15}+L_{16}+L_{17}+L_{18}+L_{19}+L_{20}+L_{21}$.

Figure 30:
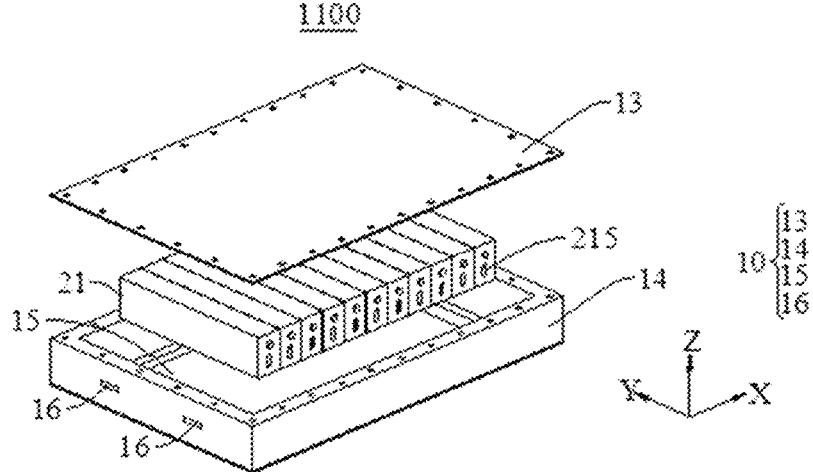
FIG. 30 is a schematic exploded view of a battery according to yet another embodiment of this application.
Figure 31:
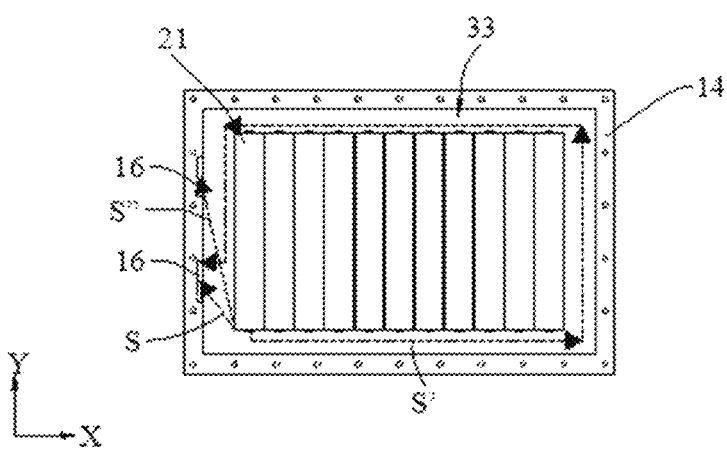
FIG. 31 is a schematic structural diagram of the battery shown in FIG. 30 with the top cover hidden.
Figure 32:
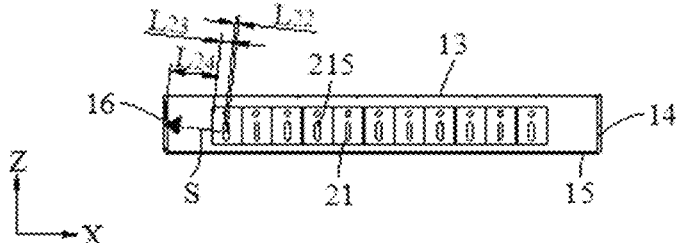
FIG. 32 is a cross-sectional view of the battery shown in FIG. 30.

In a specific embodiment, as shown in FIG. 30 to FIG. 32, the battery module 20 includes one row of battery cells 21, the row of battery cells 21 is arranged along a length direction (direction X) of the box 10, a front side of each battery cell 21 is provided with a first pressure relief mechanism 215, a left wall of the frame 14 is provided with two second pressure relief mechanisms 16 arranged front and rear, and an annular channel 33 is formed between the row of battery cells 21 and an inner wall of the frame 14. In this way, the emissions released by the battery cell 21 due to thermal runaway flow to the second pressure relief mechanism 16 through the annular channel 33.

For ease of description, the discharge path of the leftmost battery cell 21 is selected as an example for explanation. After the emissions of the battery cell 21 are released, there are a plurality of discharge paths. The dashed arrows in FIG. 31 illustrate a schematic diagram of three discharge paths of the emissions of the battery cell 21 from the first pressure relief mechanism 215 to the second pressure relief mechanism 16. The discharge path of the emissions discharged leftward to the second pressure relief mechanism 16 on the front side is a first discharge path S; the discharge path of the emissions discharged rightward to the second pressure relief mechanism 16 on the front side is a second discharge path S'; the discharge path of the emissions discharged leftward to the second pressure relief mechanism 16 on the rear side is a third discharge path S", the length of the second discharge path S' and the length of the third discharge path S" are both greater than the length of the first discharge path S, and the first discharge path S may be the shortest discharge path.

The length L of the first discharge path S may be measured by the following method: a projection point of a center of the first pressure relief mechanism 215 on a front side surface of the battery cell 21 is a first projection point, a projection point of a center of the second pressure relief mechanism 16 on the front side surface of the battery cell 21 is a second projection point, a projection line of a periphery of the first pressure relief mechanism 215 on the front side surface of the battery cell 21 is a first projection line, a line connecting the first projection point and the second projection point is an eighth connecting line, an intersection point of the eighth connecting line and the first projection line is a ninth intersection point, an intersection point of the eighth connecting line and a left side surface of the battery cell 21 is a tenth intersection point; a distance between the center of the first pressure relief mechanism 215 and the ninth intersection point is $L_{22}$, a distance between the eighth intersection point and the tenth intersection point is $L_{23}$, and a distance between the center of the second pressure relief mechanism 16 and the tenth intersection point is $L_{24}$, where $L=L_{22}+L_{23}+L_{24}$.

Figure 33:
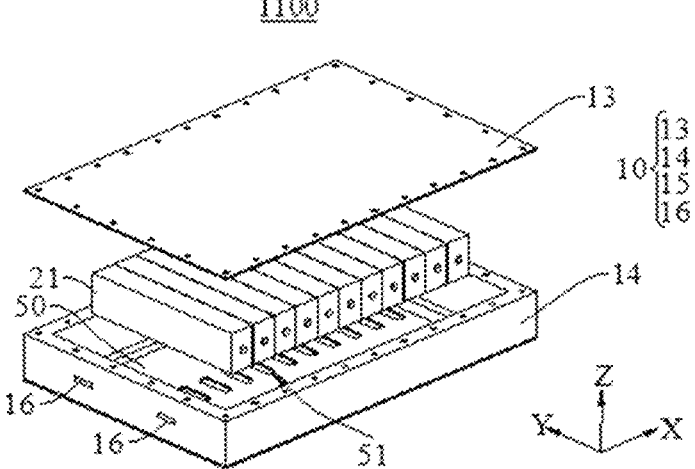
FIG. 33 is a schematic exploded view of a battery according to yet another embodiment of this application.
Figure 34:
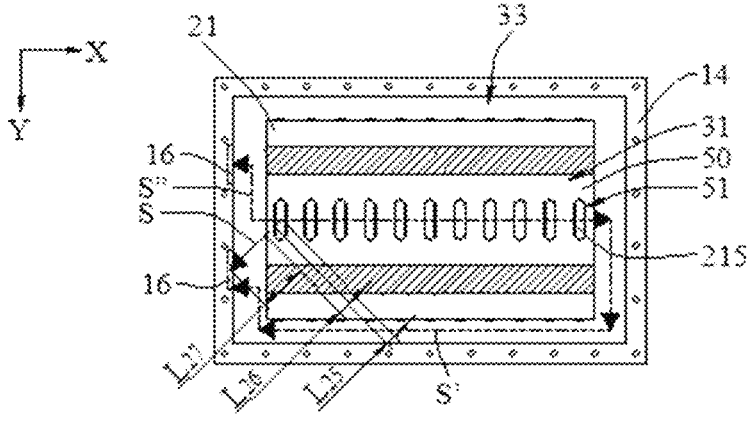
FIG. 34 is a cross-sectional view of the battery shown in FIG. 33.
Figure 35:
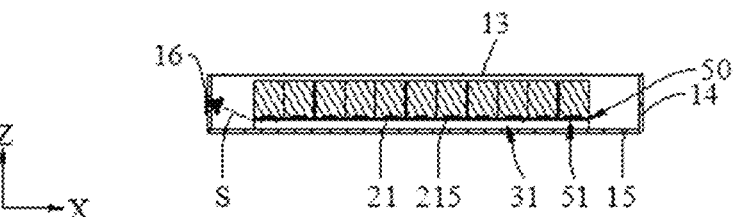
FIG. 35 is a cross-sectional view of the battery shown in FIG. 33.

In a specific embodiment, as shown in FIG. 33 to FIG. 35, the battery module 20 includes one row of battery cells 21, the row of battery cells 21 is arranged along a length direction (direction X) of the box 10, a bottom of each battery cell 21 is provided with a first pressure relief mechanism 215, a left wall of the frame 14 is provided with two second pressure relief mechanisms 16 arranged front and rear, an annular channel 33 is formed between the battery module 20 and an inner wall of the frame 14, the annular channel 33 also extends between a partition and the inner wall of the frame 14, the battery cell 21 is supported on the bottom plate 15 through the partition 50, a first sub-pressure relief channel 31 is formed between the partition 50 and the bottom plate 15, the partition 50 is provided with a plurality of first ventilatable structures 51, and the plurality of first ventilatable structures 51 are respectively connected one-to-one with the first pressure relief mechanisms 215 of each battery cell 21. In this way, the emissions released by the battery cell 21 due to thermal runaway flow to the second pressure relief mechanism 16 through the first sub-pressure relief channel 31 and the annular channel 33, where the first ventilatable structure 51 is a through hole, and the partition 50 is a liquid cooling plate.

For ease of description, the discharge path of the leftmost battery cell 21 is selected as an example for explanation. After the emissions of the battery cell 21 are released, there are a plurality of discharge paths. The dashed arrows in FIG. 34 illustrate a schematic diagram of three discharge paths of the emissions of the battery cell 21 from the first pressure relief mechanism 215 to the second pressure relief mechanism 16. The discharge path of the emissions discharged leftward to the second pressure relief mechanism 16 on the rear side is a first discharge path S; the discharge path of the emissions discharged rightward to the second pressure relief mechanism 16 on the rear side is a second discharge path S'; the discharge path of the emissions discharged leftward to the second pressure relief mechanism 16 on the front side is a third discharge path S", the length of the second discharge path S' and the length of the third discharge path S" are both greater than the length of the first discharge path S, and the first discharge path S may be the shortest discharge path.

The length L of the first discharge path S may be measured by the following method: a projection point of a center of the first pressure relief mechanism 215 on a bottom surface of the partition 50 is a first projection point, a projection point of a center of the second pressure relief mechanism 16 on the bottom surface of the partition 50 is a second projection point, a projection line of a periphery of the first pressure relief mechanism 215 on the bottom surface of the partition 50 is a first projection line, a line connecting the first projection point and the second projection point is a ninth connecting line, an intersection point of the ninth connecting line and the first projection line is an eleventh intersection point, an intersection point of the ninth connecting line and a left wall surface of the partition 50 is a twelfth intersection point, a distance between the center of the first pressure relief mechanism 215 and the eleventh intersection point is $L_{25}$, a distance between the eleventh intersection point and the twelfth intersection point is $L_{26}$, and a distance between the twelfth intersection point and the center of the second pressure relief mechanism 16 is $L_{27}$, where $L=L_{25}+L_{26}+L_{27}$.

In a specific embodiment, as shown in FIG. 8 and FIG. 11, this embodiment differs from the previous embodiment in that: the battery module 20 includes two rows of battery cells 21, the two rows of battery cells 21 are arranged along a width direction (direction Y) of the box 10, each of two ends of each row of battery cells 21 is connected to an end plate 22, a right wall of the frame 14 is provided with two second pressure relief mechanisms 16 distributed front and rear, and projections of centers of the first pressure relief mechanisms 215 of the two rows of battery cells 21 respectively coincide with centers of the corresponding second pressure relief mechanisms 16 in a width direction (direction Y) of the battery cell 21; the battery cell 21 is supported on the partition 50, the partition 50 is supported on the bottom plate 15 by the spacing elements 60, the number of spacing elements 60 is three, the three spacing elements 60 enclose two first sub-pressure relief channels 31 extending along the width direction (direction Y) of the box 10, the two first sub-pressure relief channels 31 are respectively connected to the first pressure relief mechanisms 215 of the two rows of battery cells 21, and each row of battery cells 21 has one corresponding first sub-pressure relief channel 31 connected. In this way, the emissions released by the battery cell 21 due to thermal runaway flow to the second pressure relief mechanism 16 through the first sub-pressure relief channel 31 and the annular channel 33. In some embodiments, the first ventilatable structure 51 is a through hole, and the partition 50 is a liquid cooling plate.

For ease of description, the discharge path of the rightmost and frontmost battery cell 21 is selected as an example for explanation. After the emissions of the battery cell 21 are released, there are a plurality of discharge paths. The dashed arrows in FIG. 8 and FIG. 11 illustrate a schematic diagram of three discharge paths of the emissions of the battery cell 21 from the first pressure relief mechanism 215 to the second pressure relief mechanism 16. The discharge path of the emissions discharged rightward to the second pressure relief mechanism 16 on the front side is a first discharge path S; the discharge path of the emissions discharged rightward to the second pressure relief mechanism 16 on the rear side is a second discharge path S'; the discharge path of the emissions discharged leftward to the second pressure relief mechanism 16 on the front side is a third discharge path S", the length of the second discharge path S' and the length of the third discharge path S" are both greater than the length of the first discharge path S, and the first discharge path S may be the shortest discharge path.

The length L of the first discharge path S may be measured by the following method: a projection point of a center of the first pressure relief mechanism 215 on a bottom surface of the partition 50 is a first projection point, a projection point of a center of the second pressure relief mechanism 16 on the bottom surface of the partition 50 is a second projection point, a projection line of a periphery of the first ventilatable structure 51 on the bottom surface of the partition 50 is a first projection line, a line connecting the first projection point and the second projection point is a tenth connecting line, an intersection point of the tenth connecting line and the first projection line is a thirteenth intersection point, an intersection point of a right side wall of the partition 50 and the tenth connecting line is a fourteenth intersection point, an intersection point of a plane passing through the tenth connecting line and perpendicular to the bottom surface of the partition 50 with a lower edge line of a right wall surface of the right end plate 22 is a fifteenth intersection point, a distance between the center of the first pressure relief mechanism 215 and the thirteenth intersection point is $L_{28}$, a distance between the thirteenth intersection point and the fourteenth intersection point is $L_{29}$, a distance between the fourteenth intersection point and the fifteenth intersection point is $L_{30}$, and a distance between the center of the second pressure relief mechanism 16 and the fifteenth intersection point is $L_{31}$, where $L=L_{28}+L_{29}+L_{30}+L_{31}$.

In a specific embodiment, as shown in FIG. 12 to FIG. 14, this embodiment differs from the previous embodiment in that: the end plates 22 of the battery module 20 extend into the annular channel 33 and form a sealing structure with the bottom plate 15, the number of spacing elements 60 is twelve, the twelve spacing elements 60 are arranged in a matrix and enclose two first sub-pressure relief channels 31 and three second sub-pressure relief channels 34, the first sub-pressure relief channel 31 extends along a width direction (direction Y) of the box 10, the two first sub-pressure relief channels 31 are spaced apart along the width direction (direction Y) of the box 10, the second sub-pressure relief channel 34 extends along the width direction (direction Y)

of the box 10, and the three second sub-pressure relief channels 34 are spaced apart along a length direction (direction X) of the box 10. In this way, the emissions released by the battery cell 21 cannot pass through the end plates 22 to the right into the annular channel 33, but must flow along the first sub-pressure relief channel 31 into the second sub-pressure relief channel 34, then enter the annular channel 33 through the second sub-pressure relief channel 34, and finally flow to the second pressure relief mechanism 16.

For ease of description, the discharge path of the rightmost and frontmost battery cell 21 is selected as an example for explanation. After the emissions of the battery cell 21 are released, there are a plurality of discharge paths. The dashed arrows in FIG. 13 illustrate a schematic diagram of three discharge paths of the emissions of the battery cell 21 from the first pressure relief mechanism 215 to the second pressure relief mechanism 16. The discharge path of the emissions discharged forward to the second pressure relief mechanism 16 on the front side is a first discharge path S; the discharge path of the emissions discharged rearward to the second pressure relief mechanism 16 on the rear side is a second discharge path S'; the discharge path of the emissions discharged rearward to the second pressure relief mechanism 16 on the front side is a third discharge path S", the length of the second discharge path S' and the length of the third discharge path S" are both greater than the length of the first discharge path S, and the first discharge path S may be the shortest discharge path.

The length L of the first discharge path S can be measured by the following method: a projection point of a center of the first pressure relief mechanism 215 on a bottom surface of the partition 50 is a first projection point, a projection point of a center of the second pressure relief mechanism 16 on a front wall surface of the rightmost-front spacing element 60 is a second projection point, a projection line of a periphery of the first ventilatable structure 51 on the bottom surface of the partition 50 is a first projection line, an intersection line of a left wall surface of the rightmost-front spacing element 60 and the bottom surface of the partition 50 is a seventh intersection line, a line connecting a rear endpoint of the seventh intersection line and the first projection point is an eleventh connecting line, an intersection point of the eleventh connecting line and the first projection line is a sixteenth intersection point, a line connecting a front endpoint of the seventh intersection line and the second projection point is a twelfth connecting line, an intersection point of a right wall surface of the right end plate 22 and the twelfth connecting line is a seventeenth intersection point, a distance between the center of the first pressure relief mechanism 215 and the sixteenth intersection point is $L_{32}$, a distance between the sixteenth intersection point and the rear endpoint of the seventh intersection line is $L_{33}$, a length of the seventh intersection line is $L_{34}$, a distance between the front endpoint of the seventh intersection line and the seventeenth intersection point is $L_{35}$, and a distance between the seventeenth intersection point and the center of the second pressure relief mechanism 16 is $L_{36}$, where $L=L_{32}+L_{33}+L_{34}+L_{35}+L_{36}$.

Figure 15:
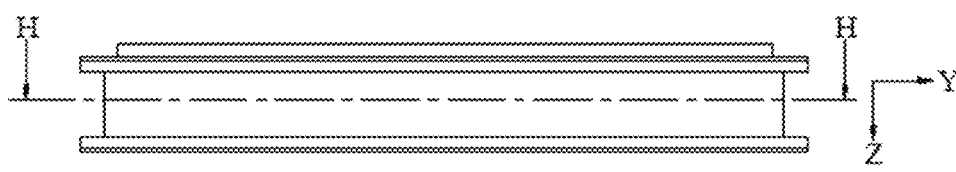
FIG. 15 is a schematic structural diagram of a battery according to yet another embodiment of this application.
Figure 20:
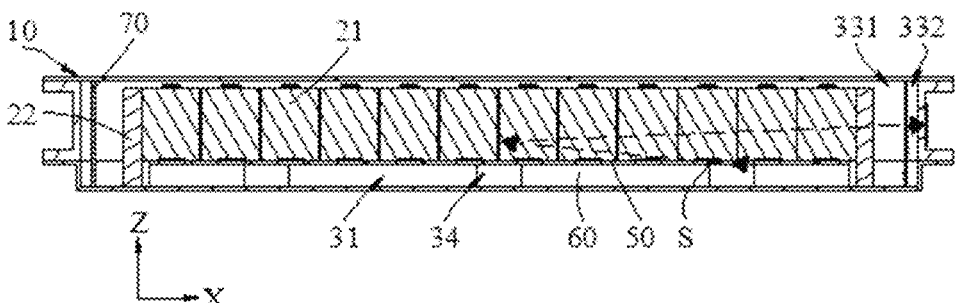
FIG. 20 is a cross-sectional view of the battery shown in FIG. 15.

In a specific embodiment, as shown in FIG. 15, FIG. 16, or FIG. 20, this embodiment differs from the previous embodiment in that: an annular member 70 is provided within the annular channel 33, the annular member 70 divides the annular channel 33 into a first sub-annular channel 331 and a second sub-annular channel 332, a second ventilatable structure 71 is provided at a middle portion of a front sidewall and a rear sidewall of the annular member 70, the second ventilatable structure 71 may communicate the first sub-annular channel 331 with the second sub-annular channel 332, and the second ventilatable structure 71 is a through hole. In this way, after the emissions released by the battery cell 21 exit the second sub-pressure relief channel 34, the emissions enter the first sub-annular channel 331, then enter the second sub-pressure relief channel 34 through the second ventilatable structure 71, and finally flow along the second sub-pressure relief channel 34 to the second pressure relief mechanism 16. Referring to the figures, the first discharge path S extends from the second sub-pressure relief channel 34 into the first sub-annular channel 331, so that the emissions enter the second sub-pressure relief channel 34 through the second ventilatable structure 71, and finally flow to the second pressure relief mechanism 16.

The length L of the first discharge path S may be measured by the following method: a projection point of a center of the second pressure relief mechanism 16 on a front wall surface of a front sidewall portion 72 of the annular member 70 is a second projection point, a projection point of a center of the first ventilatable structure 51 on the front wall surface of the front sidewall portion 72 of the annular member 70 is a third projection point, a line connecting the second projection point and the third projection point is a thirteenth connecting line, an intersection point of a right wall surface of a right sidewall portion 72 of the annular member 70 and the thirteenth connecting line is an eighteenth intersection point, a distance between the front endpoint of the seventh intersection line and the third projection point is $L_{37}$, a distance between the third projection point and the eighteenth intersection point is $L_{38}$, and a distance between the eighteenth intersection point and the center of the second pressure relief mechanism 16 is $L_{39}$, where $L=L_{32}+L_{33}+L_{34}+L_{37}+L_{38}+L_{39}$.

In another embodiment of this application, as shown in FIG. 8 and FIG. 11, a pressure relief area of the second pressure relief mechanism 16 is S, and a length of a shortest discharge path formed between the first pressure relief mechanism 215 of any one battery cell 21 and the second pressure relief mechanism 16 is L; and $$0.25 \text{ dm}^{-1} \le \frac{L}{S} < 250 \text{ dm}^{-1},$$

where a unit of S is dm², and a unit of L is dm.

The first pressure relief mechanism 215 of any one battery cell 21 can be understood as the first pressure relief mechanism 215 of each battery cell 21, meaning that the shortest discharge path between the first pressure relief mechanism 215 of each battery cell 21 and the second pressure relief mechanism 16 meets the above equation.

By adopting the technical solution of this embodiment, the shortest discharge path L of each battery cell 21 and the pressure relief area S of the second pressure relief mechanism 16 are within a reasonable design range, which better enhances the reliability of the battery 1100 during use.

In another embodiment of this application, $$0.25 \text{ dm}^{-1} \le \frac{L}{S} \le 100 \text{ dm}^{-1}.$$

By adopting the technical solution of this embodiment, the setting of $$0.25 \text{ dm}^{-1} \le \frac{L}{S} \le 100 \text{ dm}^{-1}$$

ensures that the pressure relief area S of the second pressure relief mechanism 16 and the length L of the shortest discharge path of the battery cell 21 have a more reasonable design, which reduces the risk of excessive exhaust temperature of the battery 1100 and helps enhance the reliability of the battery 1100 during use. Under the condition that $$\frac{L}{S} \le 100 \text{ dm}^{-1}$$

is met, when the length L of the shortest discharge path of the battery cell 21 remains constant, the pressure relief area S of the second pressure relief mechanism 16 may be designed larger, which improves the smoothness of emission discharge from the box 10 and reduces the risk of severe bulging of the box 10 due to poor exhaust.

In one embodiment, the value of may be but is not limited to 0.25 dm⁻¹, 0.5 dm⁻¹, 1 dm⁻¹, 10 dm⁻¹, 20 dm⁻¹, 30 dm⁻¹, 40 dm⁻¹, 50 dm⁻¹, 60 dm⁻¹, 70 dm⁻¹, 80 dm⁻¹, 90 dm⁻¹, 100 dm⁻¹, 110 dm⁻¹, 120 dm⁻¹, 130 dm⁻¹, 140 dm⁻¹, 150 dm⁻¹, 160 dm⁻¹, 170 dm⁻¹, 180 dm⁻¹, 190 dm⁻¹, 200 dm⁻¹, 210 dm⁻¹, 220 dm⁻¹, 230 dm⁻¹, 240 dm⁻¹, or 249 dm⁻¹.

In another embodiment of this application, $0.5 \text{ dm} \le L \le 29$ dm.

By adopting the technical solution of this embodiment, the length L of the shortest discharge path being within this range ensures that the shortest discharge path is not designed too short, which would result in a short cooling time for particulate matter, leading to high temperatures of the particulate matter discharged from the battery 1100 and potentially deteriorating the external environment of the battery 1100; nor is the shortest discharge path designed too long, which would result in a long exhaust time and untimely pressure relief, causing severe damage to the box 10.

In some embodiments, the value of L may be, but is not limited to, 0.5 d, dm, 3 dm, 5 dm, 7 dm, 9 dm, 11 dm, 13 dm, 5 dm, 7 dm, 9 dm, 21 dm, 23 dm, 25 dm, 27 dm, or 29 dm.

Table 1 below shows parameters of the length L of the shortest discharge path, parameters of the pressure relief area S of the second pressure relief mechanism 16, and experimental results used in some experiments. The specific experimental method adopts the method described in GB 38031-2020, which will not be repeated herein.

TABLE 1

| | L (dm) | S (dm²) | $\frac{L}{S}$(dm⁻¹) | Result |
|---|---|---|---|---|
| Example 1 | 0.5 | 1.98 | 0.25 | Normal |
| Example 2 | 0.5 | 1.21 | 0.41 | Normal |
| Example 3 | 0.5 | 0.13 | 3.85 | Normal |
| Example 4 | 15.5 | 1.98 | 7.83 | Normal |
| Example 5 | 15.5 | 1.21 | 12.81 | Normal |
| Example 6 | 78 | 0.78 | 100 | Normal |
| Example 7 | 29 | 1.98 | 14.65 | Normal |
| Example 8 | 29 | 0.31 | 93.55 | Normal |
| Example 9 | 15.5 | 0.15 | 103.33 | Slight bulging of box |
| Example 10 | 15.5 | 0.13 | 119.23 | Slight bulging of box |
| Example 11 | 29 | 0.13 | 223.08 | Bulging of box |

TABLE 1-continued

| | L (dm) | S (dm²) | $\frac{L}{S}(dm^{-1})$ | Result |
|---|---|---|---|---|
| Example 12 | 29.9 | 0.12 | 249.2 | Bulging of box |
| Comparative Example 1 | 0.5 | 2.37 | 0.21 | Fire |
| Comparative Example 2 | 0.5 | 5.11 | 0.10 | Fire |
| Comparative Example 3 | 0.5 | 6.23 | 0.08 | Fire |
| Comparative Example 4 | 17.5 | 0.07 | 250 | Severe damage to box |
| Comparative Example 5 | 28 | 0.11 | 255 | Severe damage to box |
| Comparative Example 6 | 29 | 0.09 | 322.22 | Severe damage to box |
| Comparative Example 7 | 29 | 0.08 | 362.50 | Severe damage to box |
| Comparative Example 8 | 29 | 0.07 | 414.29 | Severe damage to box |

From the above table, it can be learned that when the value of L/S is less than 0.25 dm⁻¹, the temperature of the particulate matter discharged from inside the box 10 is higher, the exhaust temperature of the battery 1100 is high, which is prone to causing more severe fire hazards. When the value of L/S is in the range of 0.25 dm⁻¹ to 100 dm⁻¹, the box 10 can be in a normal state. When the value of L/S is 103.33 dm⁻¹ and 249.2 dm⁻¹, the box 10 is prone to bulging, although the sealing performance of the box 10 is somewhat affected, the battery 1100 can still be in a usable state. When the value of L/S is greater than or equal to 250 dm⁻¹, the sealing performance of the box 10 is prone to severe damage, and the box 10 in this case may suffer severe damage or even severe hazards due to excessive temperature.

The battery 1100 of the embodiments of this application can reduce the risk of excessive exhaust temperature caused by the ejection of high-temperature particulate matter from the battery 1100 by reasonably designing the pressure relief area of the second pressure relief mechanism 16 and the length of the shortest discharge path of the emissions, and can also reduce the risk of severe bulging or even explosion of the battery 1100 due to insufficient pressure relief area leading to untimely pressure relief.

In another embodiment of this application, a volumetric energy density of the battery 1100 is E, and a pressure relief area of the second pressure relief mechanism 16 is S; and $$200\ (Wh/L)/dm^2 < \frac{E}{S} < 6100\ (Wh/L)/dm^2,$$

where a unit of E is Wh/L, and a unit of S is dm².

The volumetric energy density of the battery 1100 may refer to the energy contained per unit volume of the battery 1100, and in actual use, the volumetric energy density of the battery 1100 can be directly read from a nameplate of the battery 1100.

In general, as the volumetric energy density of the battery 1100 increases, the severity of thermal runaway of the battery 1100 increases, and the battery cell 21 releases emissions more intensely, resulting in higher temperature and faster-moving emissions surging along the pressure relief channel 30 toward the second pressure relief mechanism 16, which increases the risk of excessive exhaust temperature of the battery 1100.

By adopting the technical solution of this embodiment, the setting of $$200\ (Wh/L)/dm^2 < \frac{E}{S} < 6100\ (Wh/L)/dm^2$$

ensures that the pressure relief area S of the second pressure relief mechanism 16 and the volumetric energy density E of the battery 1100 have a reasonable design, which reduces the risk of excessive exhaust temperature of the battery 1100 and helps enhance the reliability of the battery 1100 during use. Under the condition that $$\frac{E}{S} < 6100\ (Wh/L)/dm^2$$

is met, when the volumetric energy density of the battery 1100 remains constant, the pressure relief area S of the second pressure relief mechanism 16 is not designed too small, allowing the filter holes to enable smooth and rapid passage of particulate matter, which reduces the risk of severe damage to the box 10 due to an excessively low pressure relief rate. Under the condition that $$\frac{E}{S} > 200\ (Wh/L)/dm^2$$

is met, when the volumetric energy density of the battery 1100 remains constant, the pressure relief area S of the second pressure relief mechanism 16 is not designed too large, preventing oxygen from the air outside the battery 1100 from flowing back into the box 10 and becoming in contact with the high-temperature emissions inside the box 10, which reduces the risk of excessive exhaust temperature of the battery 1100 and enhances the reliability of the battery 1100 during use.

In another embodiment of this application, $$200\ (Wh/L)/dm^2 < \frac{E}{S} \le 4500\ (Wh/L)/dm^2.$$

By adopting the technical solution of this embodiment, the pressure relief area S of the second pressure relief mechanism 16 and the volumetric energy density E of the battery 1100 have a more reasonable design, which reduces the risk of excessive exhaust temperature of the battery 1100, and better enhances the reliability of the battery 1100 during use. Additionally, under the condition that $$\frac{E}{S} \le 4500\ (Wh/L)/dm^2$$

is met, when the volumetric energy density E of the battery 1100 remains constant, the pressure relief area S of the second pressure relief mechanism 16 may be designed larger, which improves the smoothness of emission discharge from the box 10 and reduces the risk of severe bulging of the box 10 due to poor exhaust.

In one embodiment, the value of E/S may be but is not limited to 200.1 (Wh/L)/dm², 201 (Wh/L)/dm², 250 (Wh/L)/dm², 500 (Wh/L)/dm², 750 (Wh/L)/dm², 1000 (Wh/L)/ dm$^2$, 1250 (Wh/L)/dm$^2$, 1500 (Wh/L)/dm$^2$, 2000 (Wh/L)/dm$^2$, 2500 (Wh/L)/dm$^2$, 3000 (Wh/L)/dm$^2$, 3500 (Wh/L)/dm$^2$, 4000 (Wh/L)/dm$^2$, 4500 (Wh/L)/dm$^2$, 5000 (Wh/L)/dm$^2$, 5500 (Wh/L)/dm$^2$, 6000 (Wh/L)/dm$^2$, or 6099.9 (Wh/L)/dm$^2$.

Table 2 below shows parameters of the volumetric energy density E of the battery 1100, parameters of the pressure relief area S of the second pressure relief mechanism 16, and experimental results used in some experiments. The specific experimental method adopts the method described in GB 38031-2020, which will not be repeated herein.

TABLE 2

| | E (Wh/L) | S (dm$^2$) | $\frac{E}{S}$ ((Wh/$L$)/dm$^2$) | Result |
|---|---|---|---|---|
| Example 1 | 422 | 2.1 | 201 | Normal |
| Example 2 | 421 | 1.98 | 213 | Normal |
| Example 3 | 579 | 1.98 | 292 | Normal |
| Example 4 | 421 | 1.21 | 348 | Normal |
| Example 5 | 787 | 1.98 | 397 | Normal |
| Example 6 | 579 | 1.21 | 479 | Normal |
| Example 7 | 787 | 0.31 | 2539 | Normal |
| Example 8 | 421 | 0.13 | 3238 | Normal |
| Example 8 | 579 | 0.13 | 4454 | Normal |
| Example 9 | 630 | 0.14 | 4500 | Normal |
| Example 10 | 721 | 0.16 | 4506 | Slight bulging of box |
| Example 11 | 787 | 0.13 | 6054 | Bulging of box |
| Example 12 | 792 | 0.13 | 6092 | Bulging of box |
| Comparative Example 1 | 410 | 2.05 | 200 | Fire |
| Comparative Example 2 | 495 | 2.5 | 198 | Fire |
| Comparative Example 3 | 421 | 2.37 | 178 | Fire |
| Comparative Example 4 | 421 | 5.11 | 82 | Fire |
| Comparative Example 5 | 421 | 6.23 | 68 | Fire |
| Comparative Example 6 | 793 | 0.13 | 6100 | Severe damage to box |
| Comparative Example 7 | 733 | 0.12 | 6108 | Severe damage to box |
| Comparative Example 8 | 787 | 0.11 | 7155 | Severe damage to box |
| Comparative Example 9 | 787 | 0.103 | 7641 | Severe damage to box |
| Comparative Example 10 | 787 | 0.1 | 7870 | Severe damage to box |

From the above table, it can be learned that when the value of E/S is less than or equal to 200 (Wh/L)/dm$^2$, the temperature of the particulate matter discharged from inside the box 10 is higher, the exhaust temperature of the battery 1100 is high, which is prone to causing more severe fire hazards. When the value of E/S is in the range of 201 (Wh/L)/dm$^2$ to 4500 (Wh/L)/dm$^2$, the box 10 can be in a normal state. When the value of E/S is in the range of 4506 (Wh/Ly/dm$^z$ to 6092 (Wh/L)/dm$^2$, the box 10 is prone to bulging, although the sealing performance of the box 10 is somewhat affected, the battery 1100 can still be in a usable state. When the value of E/S is greater than or equal to 6100 (Wh/L)/dm$^2$, the sealing performance of the box 10 is prone to severe damage, and the box 10 in this case may suffer severe damage and severe hazards due to excessive temperature.

In another embodiment of this application, a pressure relief area of the second pressure relief mechanism 16 is S, a volumetric energy density of the battery 1100 is E, and a length of a shortest discharge path formed between the first pressure relief mechanism 215 of at least one battery cell 21 and the second pressure relief mechanism 16 is L; and $$1.06 \times 10^2 \ (\text{Wh/L})/\text{dm} \leq \frac{E \times L}{S} \leq 1.76 \times 10^5 \ (\text{Wh/L})/\text{dm},$$

where a unit of E is Wh/L, a unit of S is dm$^2$, and a unit of L is dm.

By adopting the technical solution of this embodiment, the value of $$\frac{E \times L}{S}$$

being within the above range ensures that the pressure relief area S of the second pressure relief mechanism 16, the volumetric energy density E of the battery 1100, and the length L of the shortest discharge path formed between the first pressure relief mechanism 215 of the battery cell 21 and the second pressure relief mechanism 16 have a more reasonable design, which reduces the risk of excessive exhaust temperature of the battery 1100 and better enhances the reliability of the battery 1100 during use. Under the condition that $$\frac{E \times L}{S} \leq 1.76 \times 10^5 \ (\text{Wh/L})/\text{dm}$$

is met, when the value of E×L remains constant, the pressure relief area S of the second pressure relief mechanism 16 is not designed too small, allowing the filter holes to enable smooth and rapid passage of particulate matter, which reduces the risk of severe damage to the box 10 due to an excessively low pressure relief rate. Under the condition that $$\frac{E \times L}{S} \geq 1.06 \times 10^2 \ (\text{Wh/L})/\text{dm}$$

is met, when the value of E×L remains constant, the pressure relief area S of the second pressure relief mechanism 16 is not designed too large, preventing oxygen from the air outside the battery 1100 from flowing back into the box 10 and becoming in contact with the high-temperature emissions inside the box 10, which reduces the risk of excessive exhaust temperature of the battery 1100 and enhances the reliability of the battery 1100 during use.

In another embodiment of this application, a pressure relief area of the second pressure relief mechanism 16 is S, a volumetric energy density of the battery 1100 is E, and a length of a shortest discharge path formed between the first pressure relief mechanism 215 of an one battery cell 21 and the second pressure relief mechanism 16 is L; and $$1.06 \times 10^2 \ (\text{Wh/L})/\text{dm} \leq \frac{E \times L}{S} \leq 1.76 \times 10^5 \ (\text{Wh/L})/\text{dm},$$

where a unit of E is Wh/L, a unit of S is dm$^2$, and a unit of L is dm.

By adopting the technical solution of this embodiment, the shortest discharge path L of each battery cell 21, the pressure relief area S of the second pressure relief mechanism 16, and the volumetric energy density E of the battery cell 21 are within a reasonable design range, which better enhances the reliability of the battery 1100 during use.

In another embodiment of this application, $$1.06 \times 10^2 \text{ (Wh/L)/dm} \le \frac{E \times L}{S} \le 1.29 \times 10^5 \text{ (Wh/L)/dm}.$$

By adopting the technical solution of this embodiment, the shortest discharge path L of the battery cell 21, the pressure relief area S of the second pressure relief mechanism 16, and the volumetric energy density E of the battery cell 21 are within a more reasonable design range, which better enhances the reliability of the battery 1100 during use. Additionally, under the condition that $$\frac{E \times L}{S} \le 1.29 \times 10^5 \text{ (Wh/L)/dm}$$

is met, when the value of E×L remains constant, the pressure relief area S of the second pressure relief mechanism 16 may be designed larger, which improves the smoothness of emission discharge from the box 10 and reduces the risk of severe bulging of the box 10 due to poor exhaust.

In some embodiments, the value of $$\frac{E \times L}{S}$$

may be but is not limited to $1.06 \times 10^2$ (Wh/L)/dm, $2 \times 10^2$ (Wh/L)/dm, $1 \times 10^3$ (Wh/L)/dm, $2 \times 10^3$ (Wh/L)/dm, $4 \times 10^3$ (Wh/L)/dm, $6 \times 10^3$ (Wh/L)/dm, $8 \times 10^3$ (Wh/L)/dm, $1 \times 10^4$ (Wh/L)/dm, $2 \times 10^4$ (Wh/L)/dm, $4 \times 10^4$ (Wh/L)/dm, $6 \times 10^4$ (Wh/L)/dm, $8 \times 10^4$ (Wh/L)/dm, $1 \times 10^3$ (Wh/L)/dm, $1.29 \times 10^3$ (Wh/L)/dm, or $1.67 \times 10^3$ (Wh/L)/dm.

In another embodiment of this application, 400 Wh/L≤E≤800 Wh/L.

By adopting the technical solution of this embodiment, the volumetric energy density E of most batteries 1100 falls within the above range, so that the above formula can be applied to most batteries 1100, with a wide range of applicability.

In one embodiment, the value of E may be, but is not limited to, 400 Wh/L, 450 Wh/L, 500 Wh/L, 550 Wh/L, 600 Wh/L, 650 Wh/L, 700 Wh/L, 750 Wh/L, or 800 Wh/L.

In another embodiment of this application, 0.1 dm²≤S≤2 dm².

By adopting the technical solution of this embodiment, the pressure relief area S of the second pressure relief mechanism 16 being within the above range can reduce the risk of severe damage to the box 10 and excessive temperature, and help enhance the reliability of the battery 1100 during use. If the pressure relief area S of the second pressure relief mechanism 16 is designed too small, exhaust becomes obstructed, causing untimely pressure relief and easily leading to severe damage to the box 10; and if the pressure relief area S of the second pressure relief mechanism 16 is designed too large, oxygen from the air outside the battery 1100 may flow back into the box 10 and become in contact with the high-temperature emissions inside the box 10, which helps reduce the risk of excessive temperature of the battery 1100 and enhance the reliability of the battery 1100 during use.

In another embodiment of this application, 0.3 dm²≤S≤1 dm².

By adopting the technical solution of this embodiment, the pressure relief area S of the second pressure relief mechanism 16 is designed more reasonably, which further reduces the risks of severe damage to the box 10 and excessive temperature of the battery 1100, and helps enhance the reliability of the battery 1100 during use.

In one embodiment, the value of S may be, but is not limited to, 0.1 dm², 0.2 dm², 0.4 dm², 0.6 dm², 0.8 dm², 1 dm², 1.2 dm², 1.4 dm², 1.6 dm², 1.8 dm², or 2 dm².

Table 3 below shows parameters of the volumetric energy density E of the battery 1100, parameters of the pressure relief area S of the second pressure relief mechanism 16, the shortest discharge path L of the battery cell 21, and experimental results used in some experiments. The specific experimental method adopts the method described in GB 38031-2020, which will not be repeated herein.

TABLE 3

| | L (dm) | E (Wh/L) | S (dm²) | $\frac{E \times L}{S}$ ((Wh/L)/dm) | Result |
|---|---|---|---|---|---|
| Example 1 | 0.5 | 421 | 1.98 | $1.06 \times 10^2$ | Normal |
| Example 2 | 1 | 421 | 1.98 | $2.13 \times 10^2$ | Normal |
| Example 3 | 7 | 421 | 1.98 | $1.49 \times 10^3$ | Normal |
| Example 4 | 15.5 | 421 | 1.98 | $3.30 \times 10^3$ | Normal |
| Example 5 | 15.5 | 579 | 1.98 | $4.53 \times 10^3$ | Normal |
| Example 6 | 15.5 | 579 | 0.13 | $6.90 \times 10^4$ | Normal |
| Example 7 | 29 | 787 | 0.31 | $7.36 \times 10^4$ | Normal |
| Example 8 | 29 | 579 | 0.13 | $1.29 \times 10^5$ | Normal |
| Example 9 | 30 | 579 | 0.13 | $1.34 \times 10^5$ | Slight bulging of box |
| Example 10 | 28 | 787 | 0.13 | $1.70 \times 10^5$ | Bulging of box |
| Example 11 | 29 | 787 | 0.13 | $1.76 \times 10^5$ | Bulging of box |
| Comparative Example 1 | 0.5 | 421 | 1.93 | $1.09 \times 10^2$ | Fire |
| Comparative Example 2 | 0.5 | 421 | 2.37 | $8.88 \times 10^1$ | Fire |
| Comparative Example 3 | 0.5 | 421 | 5.11 | $4.12 \times 10^1$ | Fire |
| Comparative Example 4 | 30 | 787 | 0.13 | $1.82 \times 10^5$ | Severe damage to box |
| Comparative Example 5 | 29 | 787 | 0.08 | $2.85 \times 10^5$ | Severe damage to box |
| Comparative Example 6 | 29 | 787 | 0.06 | $3.80 \times 10^5$ | Severe damage to box |

From the above table, it can be learned that when the value of $$\frac{E \times L}{S}$$

is less than $1.06 \times 10^2$ (Wh/L)/dm, the temperature of the particulate matter discharged from inside the box 10 is higher, and the exhaust temperature of the battery 1100 is high, which is prone to causing more severe fire hazards. When the value of $$\frac{E \times L}{S}$$

is in the range of $1.06 \times 10^2$ (Wh/Ly/dm to $1.29 \times 10^{-1}$ (Wh/L)/dm, the box 10 can be in a normal state. When the value of $$\frac{E \times L}{S}$$

is in the range of 1.29×10⁵ (Wh/L)/dm to 1.76×10⁵ (Wh/L)/dm, the box 10 is prone to bulging, although the sealing performance of the box 10 is somewhat affected, the battery 1100 can still be in a usable state. When the value of $$\frac{E \times L}{S}$$

is greater than 1.76×10⁵ (Wh/L)/dm, the sealing performance of the box 10 is prone to severe damage, and the box 10 in this case may suffer severe damage or even severe hazards due to excessive temperature.

In another embodiment of this application, an electric apparatus is further provided and includes the battery 1100 of any of the above embodiments.

The descriptions of the various embodiments above tend to emphasize the differences between the embodiments. For their similarities or commonalities, they can be referred to each other. For brevity, they are not repeated herein.

The foregoing descriptions are merely preferable embodiments of this application, but are not intended to limit this application. Any modification, equivalent replacement, or improvement made without departing from the spirit and principle of this application shall fall within the protection scope of this application.

What is claimed is:

1. A battery comprising:
a box;
a battery module located inside the box, wherein the battery module comprises at least one battery cell, each battery cell being provided with a first pressure relief mechanism, and the box having a second pressure relief mechanism; and
a pressure relief channel, wherein the pressure relief channel connects the first pressure relief mechanism of at least one battery cell and the second pressure relief mechanism, the first pressure relief mechanism is configured to release emissions generated inside the battery cell into the pressure relief channel when actuated; the pressure relief channel is configured to guide the emissions to move to the second pressure relief mechanism; and the second pressure relief mechanism is configured to release the emissions from the pressure relief channel to the outside of the box when actuated,
wherein a pressure relief area of the second pressure relief mechanism is S, and a length of a shortest discharge path formed between the first pressure relief mechanism of at least one battery cell and the second pressure relief mechanism is L; and $$0.25 \text{ dm}^{-1} \le \frac{L}{S} < 250 \text{ dm}^{-1},$$

wherein a unit of S is dm², and a unit of L is dm.

2. The battery according to claim 1, wherein a volumetric energy density of the battery is E; and $$200 \text{ (Wh/L)/dm}^2 < \frac{E}{S} < 6100 \text{ (Wh/L)/dm}^2,$$

wherein a unit of E is Wh/L.

3. The battery according to claim 1, wherein a volumetric energy density of the battery is E; and $$1.06 \times 10^2 \text{ (Wh/L)/dm} \le \frac{E \times L}{S} \le 1.76 \times 10^5 \text{ (Wh/L)/dm},$$

wherein a unit of E is Wh/L.

4. The battery according to claim 1, wherein the pressure relief channel further comprises a first sub-pressure relief channel configured to be connected to the second pressure relief mechanism, and the battery further comprises a partition, wherein the partition is configured to separate the battery module from the first sub-pressure relief channel, the partition is provided with a plurality of first ventilatable structures, and each first ventilatable structure connects the first pressure relief mechanism of at least one battery cell and the first sub-pressure relief channel.

5. The battery according to claim 4, wherein the pressure relief channel comprises at least two first sub-pressure relief channels, each first sub-pressure relief channel connects the first ventilatable structures corresponding to different battery cells, and the first sub-pressure relief channels are separated by spacing elements.

6. The battery according to claim 5, wherein
the pressure relief channel further comprises a communication channel, a wall surface of the partition and an inner wall surface of the box enclose the communication channel, and each first sub-pressure relief channel is connected to the second pressure relief mechanism through the communication channel.

7. The battery according to claim 6, wherein the battery module comprises at least one row of battery cells, each row of battery cells comprises at least one battery cell, each row of battery cells is correspondingly provided with at least one first sub-pressure relief channel, each first sub-pressure relief channel extends along an arrangement direction of the corresponding row of battery cells; and each first ventilatable structure corresponding to each row of battery cells is connected to the corresponding first sub-pressure relief channel.

8. The battery according to claim 7, wherein the second pressure relief mechanism is located on a side of an end portion of the battery module along an extension direction of the first sub-pressure relief channel.

9. The battery according to claim 8, wherein the communication channel is an annular channel, and the annular channel is arranged around the partition.

10. The battery according to claim 9, wherein an end plate is provided at each of two ends of at least one row of battery cells, and the end plates are inserted into the annular channel and sealingly connected to an inner wall surface of the box; and
the pressure relief channel further comprises a second sub-pressure relief channel, wherein the second sub-pressure relief channel intersects with the first sub-pressure relief channel, and the second sub-pressure relief channel is configured to connect the corresponding first sub-pressure relief channel and the annular channel.

11. The battery according to claim 10, wherein the end plate is provided at each of two ends of each row of battery cells, and each first sub-pressure relief channel is in communication with the second sub-pressure relief channel.

12. The battery according to claim 10, wherein the pressure relief channel comprises a plurality of second sub-pressure relief channels, and the second sub-pressure relief channels are separated by the spacing elements.

13. The battery according to claim 12, wherein the plurality of second sub-pressure relief channels are spaced apart from each other along the extension direction of the first sub-pressure relief channel.

14. The battery according to any one of claim 10, wherein the first sub-pressure relief channel and the second sub-pressure relief channel are perpendicular to each other.

15. The battery according to claim 9, wherein the annular channel is provided with an annular member connected to the box, wherein the annular member is configured to divide the annular channel into a first sub-annular channel and a second sub-annular channel, the second sub-annular channel is arranged around the first sub-annular channel, the annular member is provided with a second ventilatable structure configured to connect the first sub-annular channel and the second sub-annular channel, the second sub-annular channel is connected to the second pressure relief mechanism, and the first sub-annular channel is in communication with the first sub-pressure relief channel.

16. The battery according to claim 15, wherein the annular member comprises at least three sidewall portions sequentially connected end-to-end, and the sidewall portion farthest from the second pressure relief mechanism is provided with the second ventilatable structure.

17. The battery according to claim 16, wherein the sidewall portion closest to the second pressure relief mechanism is a first sidewall portion, and at least one of the sidewall portion adjacent to the first sidewall portion and the sidewall portion opposite the first sidewall portion is provided with the second ventilatable structure.

18. A battery comprising:
a box;
a battery module located inside the box, wherein the battery module comprises at least one battery cell, each battery cell being provided with a first pressure relief mechanism, and the box having a second pressure relief mechanism; and
a pressure relief channel, wherein the pressure relief channel connects the first pressure relief mechanism of at least one battery cell and the second pressure relief mechanism, the first pressure relief mechanism is configured to release emissions generated inside the battery cell into the pressure relief channel when actuated; the pressure relief channel is configured to guide the emissions to move to the second pressure relief mechanism; and the second pressure relief mechanism is configured to release the emissions from the pressure relief channel to the outside of the box when actuated,
wherein a pressure relief area of the second pressure relief mechanism is S, and a length of a shortest discharge path formed between the first pressure relief mechanism of any one battery cell and the second pressure relief mechanism is L; and $$0.25 \text{ dm}^{-1} \leq \frac{L}{S} < 250 \text{ dm}^{-1},$$

wherein a unit of S is $\text{dm}^2$, and a unit of L is dm.

19. The battery according to claim 18, wherein a volumetric energy density of the battery is E; and $$1.06 \times 10^2 \text{ (Wh/L)/dm} \leq \frac{E \times L}{S} \leq 1.76 \times 10^5 \text{ (Wh/L)/dm},$$

wherein a unit of E is Wh/L.

* * * * *